United States Patent
Son et al.

(10) Patent No.: US 11,149,870 B2
(45) Date of Patent: Oct. 19, 2021

(54) RECIRCULATION VALVE AND HOT WATER RECIRCULATION SYSTEM USING THE SAME

(71) Applicant: KYUNGDONG NAVIEN CO., LTD., Gyeonggi-do (KR)

(72) Inventors: Seung Kil Son, Seoul (KR); Chang Heoi Hu, Seoul (KR); Soon Ki Kim, Seoul (KR)

(73) Assignee: KYUNGDONG NAVIEN CO., LTD.

( * ) Notice: Subject to any disclaimer, the term of this patent is extended or adjusted under 35 U.S.C. 154(b) by 85 days.

(21) Appl. No.: 16/660,952

(22) Filed: Oct. 23, 2019

(65) Prior Publication Data
US 2020/0132311 A1 Apr. 30, 2020

(51) Int. Cl.
| | |
|---|---|
| *F16K 31/00* | (2006.01) |
| *F24D 19/10* | (2006.01) |
| *E03B 7/04* | (2006.01) |
| *F24D 17/00* | (2006.01) |

(52) U.S. Cl.
CPC ............ *F16K 31/002* (2013.01); *E03B 7/045* (2013.01); *F24D 17/0078* (2013.01); *F24D 19/1051* (2013.01)

(58) Field of Classification Search
CPC ............... F16K 31/002; F14D 17/0078; F14D 19/1051; E03B 7/045
See application file for complete search history.

(56) References Cited

U.S. PATENT DOCUMENTS

| | | | | |
|---|---|---|---|---|
| 4,068,800 | A * | 1/1978 | Doherty, Jr. | G05D 23/08 236/101 C |
| 4,132,239 | A * | 1/1979 | Bowen | G05D 23/08 137/382 |
| 4,382,899 | A * | 5/1983 | Johnson | F02M 1/10 123/401 |
| 6,450,412 | B1 * | 9/2002 | Cessac | G05D 23/10 236/48 R |
| 7,073,528 | B2 * | 7/2006 | Kempf | E03B 7/045 122/13.3 |

(Continued)

FOREIGN PATENT DOCUMENTS

| | | |
|---|---|---|
| CN | 1771384 A | 5/2006 |
| CN | 102425687 A | 4/2012 |

(Continued)

*Primary Examiner* — Umashankar Venkatesan
(74) *Attorney, Agent, or Firm* — Johnson & Martin, P.A.; James David Johnson

(57) ABSTRACT

A recirculation valve includes a housing including a hot water fluid passage which is used to allow the hot water to flow through, a cold water fluid passage to allow the cold water to flow through, and a recirculation fluid passage to allow the hot water in the hot water fluid passage to flow into the cold water fluid passage, a water pressure plate provided to close the recirculation fluid passage when the cold water or the hot water is used, and to open the recirculation fluid passage when the cold and hot waters are not used, and a bimetal plate configured to open the recirculation fluid passage as the bimetal plate is spaced apart from a recirculation opening and to close the recirculation fluid passage by making contact with the recirculation opening, and positioned downstream of the recirculation opening in a direction in which the hot water flows.

12 Claims, 15 Drawing Sheets

(56) References Cited

U.S. PATENT DOCUMENTS

| | | | |
|---|---|---|---|
| 7,721,974 B2 | 5/2010 | Inoue | |
| 9,170,584 B2* | 10/2015 | Lum | F16K 31/002 |
| 9,970,560 B2 | 5/2018 | Kendricks | |
| 10,823,298 B2* | 11/2020 | Son | F16K 1/36 |
| 2006/0163373 A1 | 7/2006 | Inoue | |
| 2017/0015135 A1 | 1/2017 | Kendricks | |
| 2017/0055765 A1* | 3/2017 | Dietz | F16K 31/002 |
| 2017/0175368 A1 | 6/2017 | Renaud et al. | |
| 2019/0249785 A1 | 8/2019 | Son et al. | |

FOREIGN PATENT DOCUMENTS

| | | |
|---|---|---|
| CN | 104832675 A | 8/2015 |
| CN | 206338117 U | 7/2017 |
| EP | 3118107 A1 | 1/2017 |
| JP | 2002309627 A | 10/2002 |
| KR | 10-2018-0013447 A | 2/2018 |
| WO | 2018021804 A1 | 2/2018 |

* cited by examiner

RECIRCULATION VALVE AND HOT WATER RECIRCULATION SYSTEM USING THE SAME

CROSS-REFERENCE TO RELATED APPLICATION

This application claims the benefit of priority to Korean Patent Application Nos. 10-2018-0127935 and 10-2018-0127934, filed in the Korean Intellectual Property Office on Oct. 25, 2018 and Oct. 25, 2018, respectively, the entire contents of which are incorporated herein by reference.

TECHNICAL FIELD

The present disclosure relates to a recirculation valve of hot water and a hot water recirculation system using the same.

BACKGROUND

Hot water is consecutively heated by a boiler while circulated throughout a hot water supply system even in the state that the hot water is not discharged, such that the hot water is supplied at a specific temperature or more.

However, in such a recirculation system, as the hot water is consecutively heated, the heated hot water may be consecutively introduced into a cold water pipe. In this process, it is necessary to stop consecutively introducing the hot water into the cold water pipe. The impact, which occurs in the process of stopping introducing the hot water into the cold water pipe, exerts a pipe and a component, so a fatigue degree may be accumulated.

When a user uses hot water or cold water, it is not preferred that the hot water having the higher temperature is supplied through the faucet. Accordingly, when the hot water has a temperature exceeding a specific limit temperature, it is necessary to stop recirculating the hot water to heat the hot water by a heat source.

SUMMARY

The present disclosure has been made to solve the above-mentioned problems occurring in the prior art while advantages achieved by the prior art are maintained intact.

An aspect of the present disclosure provides a recirculation valve capable of adjusting the recirculation of hot water while reducing noise and an impact, and a hot water recirculation system using the same.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a recirculation valve includes a housing including a hot water fluid passage communicating with a hot water supply pipe, which is used to supply hot water produced by heating source water, to allow the hot water to flow through an inner portion of the hot water fluid passage, a cold water fluid passage communicating with a cold water supply pipe to supply cold water serving as the source water to allow the cold water to flow through an inner portion of the cold water fluid passage, and a recirculation fluid passage communicating with the hot water fluid passage and the cold water fluid passage to allow the hot water in the hot water fluid passage to flow into the cold water fluid passage, a water pressure plate provided to close or open the recirculation fluid passage, to close the recirculation fluid passage when the cold water or the hot water is used, and to open the recirculation fluid passage when the cold water and the hot water are not used, and a bimetal plate configured to open the recirculation fluid passage as the bimetal plate is spaced apart from a recirculation opening, which is a section of the recirculation fluid passage, when a water temperature of the hot water is less than the reference temperature and to close the recirculation fluid passage by making contact with the recirculation opening when the water temperature of the hot temperature is equal to or greater than the reference temperature, and positioned downstream of the recirculation opening in a direction in which the hot water flows along the recirculation fluid passage.

According to another aspect of the present disclosure, a hot water recirculation system includes a heat source to produce hot water by heating cold water or returning water which serve as introduced source water, a hot water supply pipe connected with the heat source to supply the hot water to a demand place, a cold water supply pipe connected with a cold water source to supply the cold water to the demand place, a recirculation valve connected with the hot water supply pipe and the cold water supply pipe and including the recirculation fluid passage to form the returning water by transferring the hot water, which is received from the hot water supply pipe, to the cold water supply pipe, and a recirculation pipe connecting with the cold water source and the heat source, and including a pump connected with the cold water supply pipe to forcibly transfer the cold water from the cold water source to the heat source or to forcibly transfer returning water, which is received in the cold water supply pipe through the recirculation fluid passage, to the heat source. The recirculation valve includes a housing including a hot water fluid passage connected with the hot water supply pipe to allow the hot water to flow, a cold water fluid passage connected with the cold water supply pipe to allow the cold water to flow, and a recirculation fluid passage communicating with the hot water fluid passage and the cold water fluid passage to allow the hot water flowing along the hot water fluid passage to flow into the cold water fluid passage, a water pressure plate provided in the cold water fluid passage to close the recirculation fluid passage when the cold water or the hot water is used, and to open the recirculation fluid passage when the cold water are the hot water are not used, and a bimetal plate provided in the recirculation fluid passage, and deformed depending on the water temperature of the hot water flowing through the hot water fluid passage to adjust a flow rate of the hot water flowing along the recirculation fluid passage. The bimetal plate completely does not close the recirculation fluid passage.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
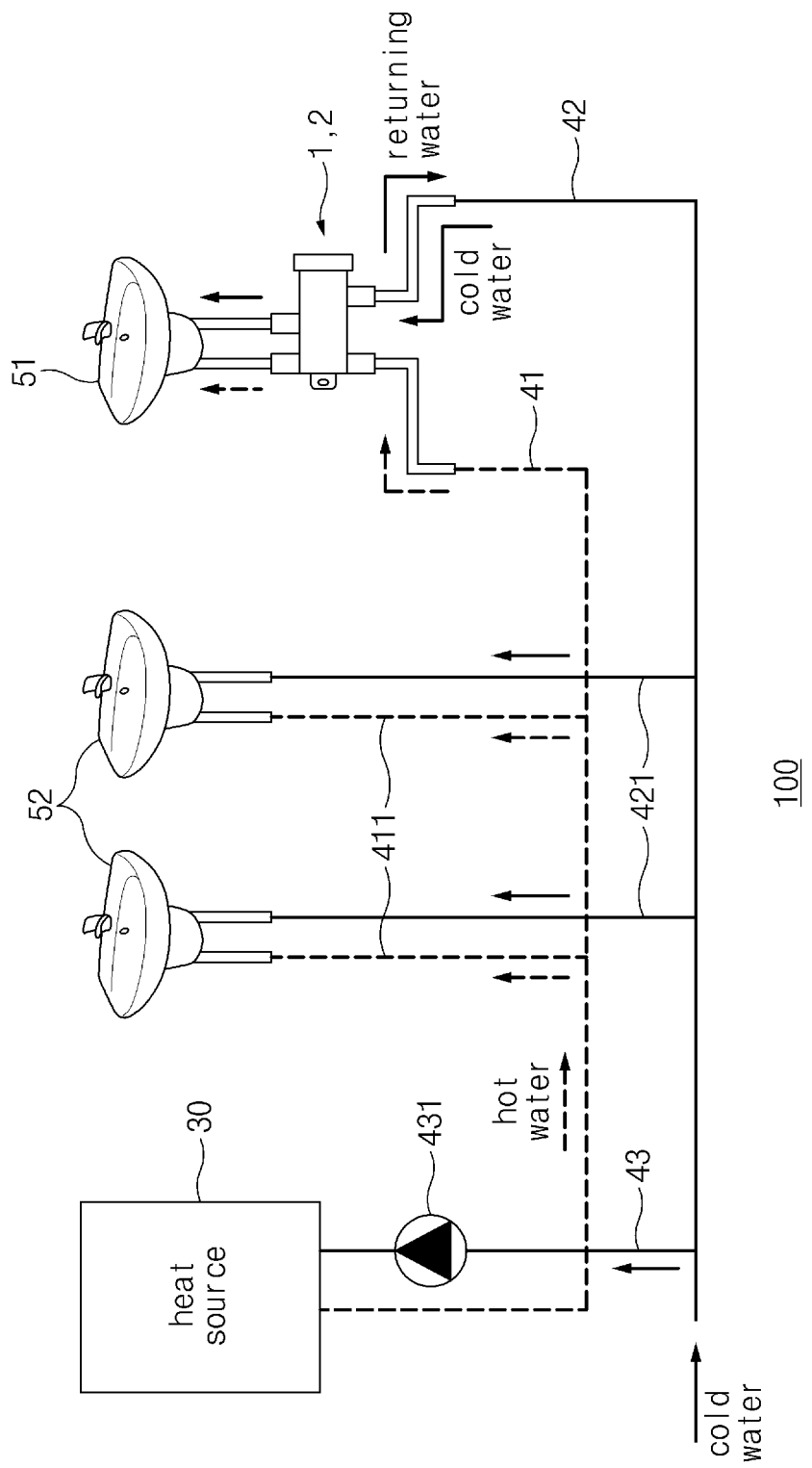
FIG. 1 is a schematic view illustrating a hot water recirculation system using recirculation valves, according to an embodiment of the present disclosure.

Hereinafter, some embodiments of the present disclosure will be described in detail with reference to the exemplary drawings. In assigning the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure In the following description of elements according to an embodiment of the present disclosure, the terms 'first', 'second', 'A', 'B', '(a)', and '(b)' may be used. These terms are merely intended to distinguish one component from another component, and the terms do not limit the nature, sequence or order of the constituent components. When a certain element is "liked to", "coupled to", or "connected with" another element, the certain element may be directly linked to or connected with the another element, and a third element may be "linked", "coupled", or "connected" between the certain element and the another element.

FIG. 1 is a schematic view illustrating a hot water recirculation system 100 using recirculation valves 1 and 2, according to an embodiment of the present disclosure.

Referring to FIG. 1, the hot water recirculation system 100 using the recirculation valves 1 and 2 includes a heat source 30, the recirculation valves 1 and 2, a hot water supply pipe 41, a cold water supply pipe 42, and a recirculation pipe 43.

The heat source 30 is a component to produce hot water by heating cold water or returning water which serves as source water introduced into the heat source 30. Therefore, a boiler including a heat exchanger to heat cold water by using sensible heat and latent heat of combustion gas obtained by combusting a fuel may be provided as the heat source 30. Another device may be provided and used as the heat source 30 in place of the boiler as long as the another device receives and heats cold water or returning water to produce the hot water.

When the temperature of the introduced water is less than a specific temperature or the flow rate of the introduced water is less than the working flow rate, the heat source 30 may operate to heat the introduced water to produce hot water to be output. Accordingly, the operation of the heat source 30 may be controlled by adjusting the flow rate. For this operation, the heat source 30 may include a flow rate sensor (not illustrated) to measure the flow rate, and further include a controller (not illustrated) including a microprocessor to operate the heat source 30 in response to an electrical signal generated from the flow rate sensor.

The heat source 30 may be connected with the recirculation pipe 43 to introduce cold water or returning water, which serves as the source water and is transferred through the cold water supply pipe 42, into the heat source 30. The cold water or the returning water serves as the source water, and the source water is heated by the heat source 30 to be hot water and discharged. The heat source 30 is connected with the hot water supply pipe 41 and the hot water is discharged through the hot water supply pipe 41.

The hot water supply pipe 41 is a component which is connected with the heat source 30 to supply hot water to a demand place 51 and has one end connected with the heat source 30 and an opposite end connected with the demand place 51. Accordingly, the hot water supply pipe 41 transfers the hot water from the heat source 30 to the demand place 51. The hot water supply pipe 41 may be connected with the demand place 51 while passing through the recirculation valves 1 and 2 from the heat source 30, or may be directly connected with other demand places 52 through other hot water supply pipes 411 branching from the hot water supply pipe 41, so the hot water supply pipe 41 supplies water to the demand place 51 or other demand places 52.

The demand place 51 and other demand places 52 may be facets to discharge hot water and cold water to the outside and to adjust the discharge extent of the hot water and the cold water as illustrated in the drawing, but is not limited thereto.

The cold water supply pipe 42 is a component connected with a cold water source to supply cold water to each demand place 51. The cold water supply pipe 42 may have one end connected with an external cold water source, which is a water supply source to supply water, to receive cold water and to allow the cold water to flow, or may be directly connected with other demands place 52 through other cold water supply pipes 421 branching from the cold water supply pipe 42 to supply cold water. As illustrated in the drawing, the cold water supply pipe 42 may pass through the recirculation valves 1 and 2 before being connected to the demand place 51.

The recirculation pipe 43 is a component connected with the cold water supply pipe 42 to allow the cold water to flow from the cold water source to the heat source 30 or to allow the returning water, which is transferred to the cold water supply pipe 42 through a recirculation fluid passage 13 formed in a housing (10, 16, and 17) of the recirculation vales 1 and 2 to be described below, to flow to the heat source 30. Accordingly, the recirculation pipe 43 is directly or indirectly connected with the cold water source and the heat source 30 such that the cold water is transferred to the heat source 30. In addition, returning water is generated from the recirculation fluid passage 13 and transferred to the heat source 30 through the cold water supply pipe 42. The recirculation pipe 43 is a component to transfer water to the heat source 30.

As illustrated in the drawings, based on a flowing direction of the cold water, one end of the recirculation pipe 43 is connected with one point of the cold water supply pipe 42, which is positioned upstream of branch points of the cold water supply pipe 42, and an opposite end of the recirculation pipe 43 is connected with the heat source 30. Accordingly, returning water flowing in an opposite direction to the flowing direction of the cold water to return to one point and cold water flowing downstream from a cold water source and transferred to the one point may be transferred to the heat source 30 through the recirculation pipe 43.

A pump 431 may be provided in the recirculation pipe 43 such that the cold water or the returning water is transferred to the heat source 30 through the recirculation pipe 43 as described above. The pump 431 pressurizes the cold water or the returning water flowing through the recirculation pipe 43 to forcibly transfer the cold water or the returning water to the heat source 30. Accordingly, the pump 431 supplies power such that hot water is circulated through the whole recirculation system.

The recirculation valves 1 and 2 are components to determine whether to recirculate the hot water in the hot water recirculation system 100 according to an embodiment of the present disclosure. The recirculation valves 1 and 2 are connected with the hot water supply pipe 41 and the cold water supply pipe 42, and include a recirculation fluid passage to form returning water by transferring hot water, which is received through the hot water supply pipe 41, to the cold water supply pipe 42. Accordingly, the hot water recirculation system 100 operates as follows.

Cold water is supplied from the cold water source to the cold water supply pipe 42. A portion of the cold water is supplied to other demand places 52 through other cold water supply pipes 421 or is transferred to the demand place 51 through the cold water supply pipe 42 and the recirculation valves 1 and 2. Another portion of the cold water is transferred to the heat source 30 through the recirculation pipe 43.

The heat source 30 heats cold water to produce and discharge the hot water. A portion of the hot water is discharged through the other hot water supply pipes 411 and supplied to the other demand places 52 or transferred to the demand place 51 through the hot water supply pipe 41 and the recirculation valves 1 and 2. Another portion of the hot water may be supplied to the cold water supply pipe 42 through the recirculation fluid passage 13 of the recirculation valves, and returns along the cold water supply pipe 42 in the opposite direction to the flowing direction of the cold water.

The water returning in the opposite direction along the cold water supply pipe 42 flows to the heat source 30 through the recirculation pipe 43. The returning water is heated again by the heat source 30 to produce hot water to be discharged through the hot water supply pipe 41.

The recirculation valves 1 and 2 adjust the flow rate of the recirculated hot water during the recirculation.

Hereinafter, the components of the recirculation valves 1 and 2 will be described in detail with reference to the drawings.

Figure 2:
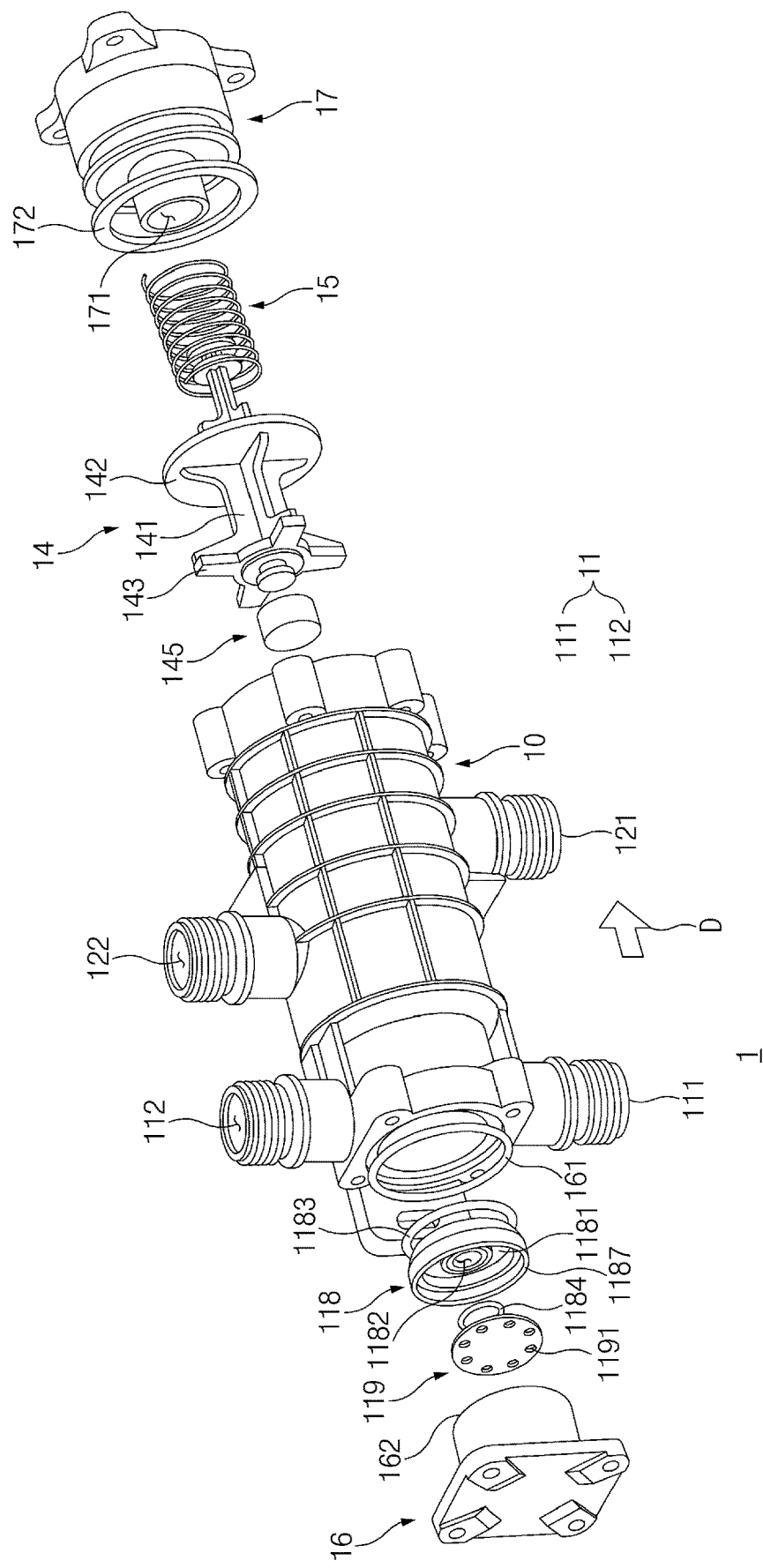
FIG. 2 is an exploded perspective view of a recirculation valve, according to an embodiment of the present disclosure.
Figure 3:
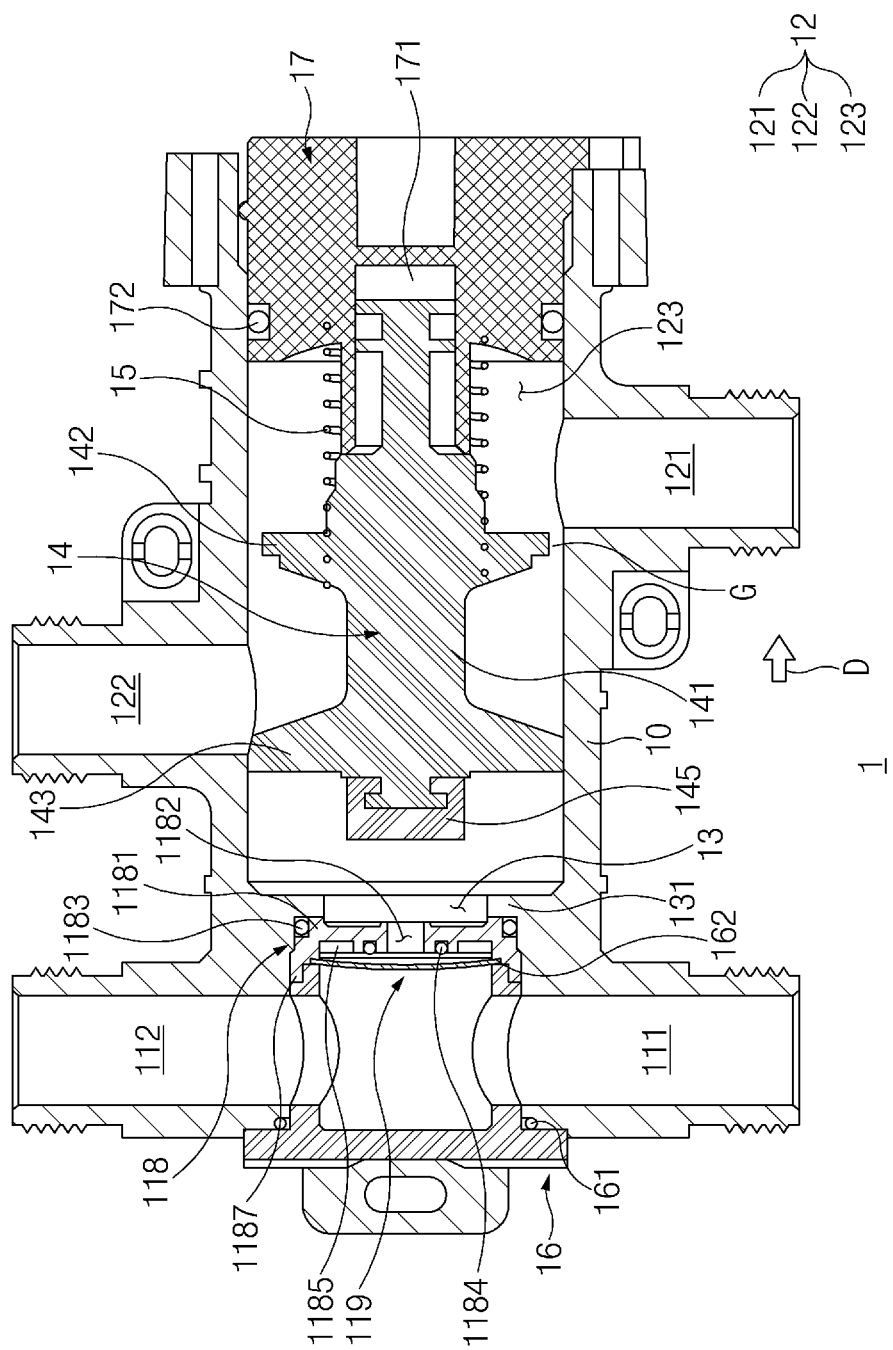
FIG. 3 is a longitudinal sectional view of a recirculation valve, according to an embodiment of the present disclosure.

FIG. 2 is an exploded perspective view of the recirculation valve 1, according to an embodiment of the present disclosure. FIG. 3 is a longitudinal sectional view of the recirculation valve 1, according to an embodiment of the present disclosure.

Referring to FIGS. 2 and 3, according to an embodiment of the present disclosure, the recirculation valve 1 includes a housing (10, 16, and 17), a water pressure plate 14, and a bimetal plate 119. In addition, the recirculation valve 1 may further include a bimetal case 118.

Housing (10, 16, and 17)

The housing (10, 16, and 17) is a component to form the outer appearance of the recirculation valve 1. The housing (10, 16, and 17) include a housing body 10 having an inner portion which is open, and a front cover 16 and a rear cover 17 that cover some of openings formed in the housing body 10. In addition, the housing (10, 16, and 17) includes a hot water fluid passage 11, a cold water fluid passage 12, and a recirculation fluid passage 13, which are provided in the open inner portion thereof.

The hot water fluid passage 11, which is a fluid passage connecting two openings of the openings of the housing (10, 16, and 17), communicates with the hot water supply pipe 41 used to supply hot water, which is produced by heating source water, to the demand place 51, such that the hot water flows through the inner portion of the hot water fluid passage 11. Accordingly, the hot water fluid passage 11 includes a hot water supply fluid passage 111 communicating with a portion of the hot water supply pipe 41 to receive hot water and a hot water discharge fluid passage 112 to discharge the hot water from the inner portion of the housing (10, 16, and 17) and to supply the hot water to the demand place 51 (see FIG. 1) through another portion of the hot water supply pipe 41. The hot water supply fluid passage 111 and the hot water discharge supply pipe 112 are connected with different openings, respectively. As illustrated in the drawings, the hot water supply fluid passage 111 and the hot water discharge fluid passage 112 may be provided while extending along the same linear line.

The front cover 16 may be disposed between the hot water supply fluid passage 111 and the hot water discharge fluid passage 112. The inner portion of the front cover 16 may be open and allow the hot water supply fluid passage 111 and the hot water discharge fluid passage 112 to communication with each other. Accordingly, the front cover 16 may form a portion of the hot water fluid passage 11. The front cover 16 is detachably coupled to the housing (10, 16, and 17) such that the assembling and the replacement of the bimetal plate 119 and the bimetal case 118, which are to be described below, are easily performed. A front cover O-ring 161 may be interposed between the front cover 16 and the housing body 10 to maintain water tight between the front cover 16 and the housing (10, 16, and 17) such that the hot water is prevented from leaking from the front cover 16. The front cover O-ring 161 may be formed of a material having elasticity.

The recirculation fluid passage 13 communicates with the hot water fluid passage 11, in an area in which the front cover 16 is disposed. Accordingly, a portion of the hot water provided through the hot water supply fluid passage 111 is transferred to the hot water discharge fluid passage 112, and a remaining portion of the hot water flows through the recirculation fluid passage 13 in the area in which the front cover 16 is disposed, to enter the recirculation process.

The cold water fluid passage 12 is a fluid passage communicating with the cold water supply pipe 42, which is used to supply cold water serving as source water to the demand place 51, and allows the cold water to flow through the inner portion of the cold water fluid passage 12. The cold water fluid passage 12 includes a cold water supply fluid passage 121 to supply the cold water to the inner portion of the housing (10, 16, and 17) and to discharge the hot water, which is introduced along the recirculation fluid passage 13 to be described below, to the outside of the housing (10, 16, and 17) for recirculation, and a cold water discharge fluid passage 122 to discharge the cold water to the outside of the housing (10, 16, and 17). In addition, the cold water fluid passage 12 includes a cold water intermediate fluid passage 123 which connects the cold water supply fluid passage 121 with the cold water discharge fluid passage 122, communicates with the recirculation fluid passage 13, and has the water pressure plate 14 therein. Accordingly, the cold water is transferred from the cold water supply fluid passage 121 to the cold water discharge fluid passage 122 through the cold water intermediate fluid passage 123 and then transferred to the demand place 51.

The cold water supply fluid passage 121 and the cold water discharge fluid passage 122 are spaced apart from each other along the extending direction of the cold water intermediate fluid passage 123 and communicate with the cold water intermediate fluid passage 123. Therefore, as the cold water supply fluid passage 121 and the cold water discharge fluid passage 122 are arranged to cross each other, the cold water flowing through the cold water supply fluid passage 121 is not directly transferred to the cold water discharged fluid passage 122 without passing through the cold water intermediate fluid passage 123 or without the interruption of the water pressure plate 14 provided in the cold water intermediate fluid passage 123. The cold water flowing through the cold water supply fluid passage 121 is transferred to the cold water discharge fluid passage 122 through the cold water intermediate fluid passage 123.

As illustrated in the drawing, the extending directions of the cold water supply passage 121 and the cold water discharge passage 122 may be not aligned in line. In addition, when the direction in which gravity acts on an object is a vertical direction, the cold water discharge fluid passage 122 may be positioned above the cold water supply fluid passage 121 in the vertical direction. The cold water supply fluid passage 121 and the cold water discharge fluid passage 122 extend in the vertical direction, and the cold water intermediate fluid passage 123 may extend in the horizontal direction perpendicular to the vertical direction.

One end of the cold water intermediate fluid passage 123 may communicate with the recirculation fluid passage 13, and an opposite end of the cold water intermediate fluid passage 123 may be closed by the rear cover 17. Therefore, the hot water is transferred from the hot water fluid passage 11 to the cold water intermediate fluid passage 123 through the recirculation fluid passage 13. The transferred hot water smoothly flows to the cold water supply fluid passage 121 and flows in the opposite direction to the flowing direction of the cold water to become the returning water.

A rear surface cover O-ring 172 may be disposed at the boundary between the inner side surface of the housing body 10 including the cold water intermediate fluid passage 123 and the rear cover 17, to maintain the water tight of the cold water intermediate fluid passage 123. The rear surface cover O-ring 172 may be formed of a material having elasticity.

The recirculation fluid passage 13 is a fluid passage allowing the hot water fluid passage 11 to communicate with the cold water fluid passage 12 such that the hot water in the hot water fluid passage 11 flows to the cold water fluid passage 12. The bimetal plate 119 and the bimetal case 118 to be described below may be disposed in the recirculation fluid passage 13. Similarly to the cold water intermediate fluid passage 123, the recirculation fluid passage 13 may be formed to be open in the horizontal direction perpendicular to the vertical direction.

Water Pressure Plate 14

The water pressure plate 14 is a component provided to close or open the recirculation fluid passage 13. The water pressure plate 14 may be received in the cold water intermediate fluid passage 123, and may move in the extending direction of the cold water intermediate fluid passage 123. The water pressure plate 14 closes the recirculation fluid passage 13 by moving when the cold water or hot water is used, and opens the recirculation fluid passage 13 by moving in the opposite direction to the direction, in which the water pressure plate 14 moves when the cold water or hot water is used, when the cold water or hot water is not used. The direction, in which the water pressure plate 14 moves when the cold water or hot water is used, is opposite to a reference direction D, in which hot water flows along the recirculation fluid passage 13, and the direction, in which the cold water or hot water moves when the cold water or the hot water is not used, may be the same as the reference direction D.

The direct water pressure of the cold water source to supply the cold water is higher than the internal pressure of the hot water fluid passage 11. Accordingly, even if only the cold water is used, so the internal pressure of the cold water fluid passage 12 is slightly lowered, the internal pressure of the cold water fluid passage 12 is still higher than the internal pressure of the hot water fluid passage 11. Therefore, the water pressure plate 14 is pressurized in the opposite direction to the reference direction D to maintain the recirculation fluid passage 13 to be closed. When only hot water is used, the internal pressure of the cold water fluid passage 12, which fails to discharge cold water, is higher than the internal pressure of the hot water fluid passage 11, which is slightly lowered as the hot water is discharged, even though the internal pressure of the cold water fluid passage 12 is pressurized by the pump 431 (see FIG. 1). Accordingly, the water pressure plate 14 is pressurized in the opposite direction to the reference direction D by the cold water to maintain the recirculation fluid passage 13 to be closed. For the same reason, even if the hot water and the cold water are used together, the recirculation fluid passage 13 is closed by the water pressure plate 14.

Since the recirculation fluid passage 13 is closed when the cold water or the hot water is used, the mixture of the cold water and the hot water, which has an undesired water temperature, is prevented from being supplied to the demand place 51 (see FIG. 1).

The water pressure plate 14 may include a shaft 141, a flange 142, and an arm 143. The shaft 141, which is a component serving as a frame of the water pressure plate 14, extends in the extending direction of the cold water intermediate fluid passage 123, and is supported by the rear cover 17 forming the inner surface of the housing (10, 16, and 17), which defines the cold water intermediate fluid passage 123. One end of the shaft 141 is disposed adjacent to the recirculation fluid passage 13 to open or close the recirculation fluid passage 13, and an opposite end of the shaft 141 is inserted into a sliding hole 171 of the rear cover 17. Accordingly, the shaft 141 may linearly move while sliding in the extending direction of the cold water intermediate fluid passage 123, in the state that the shaft 141 is guided by the sliding hole 171.

The flange 142, which is a part radially expanded from the shaft 141, is pressurized by the cold water or the hot water, such that the water pressure plate 14 linearly move in the extending direction of the cold water intermediate fluid passage 123. The flange 142 may have an outer surface formed to correspond to the shape of the inner surface of the cold water intermediate fluid passage 123. However, the outer surface of the flange 142 is spaced apart from the inner surface of the housing body 10 to form a gap G such that the hot water or the cold water flows between the outer surface of the flange 142 and the inner surface of the housing body 10. Accordingly, the cold water intermediate fluid passage 123 is not completely divided by the flange 142. When the hot water, which is output through the recirculation fluid passage 13, pressurizes the flange 142, the flange 142 is pressurized by the hot water in the reference direction D, in which the hot water flows, so the entire portion of the water pressure plate 14 may move in the reference direction D. When the cold water pressurizes the flange 142, the flange 142 is pressurized by the cold water in the opposite direction to the reference direction D, so the entire portion of the water pressure plate 14 may be moved in the opposite direction to the reference direction D.

Even the arm 143 is expanded radially from the shaft 141 similarly to the flange 142. The arm 143 is formed as if a plurality of branches extend radially toward the cold water fluid passage 123. The arm 143 may make contact with the inner surface of the housing body 10. Accordingly, although the arm 143 supports the shaft 141 with respect to the inner surface of the housing body 10 to allow the water pressure plate 14 to smoothly linearly move without deviating from the original position of the water pressure plate 14 in the cold water fluid passage 123, the arm 143 is not a component pressurized by the hot water or the cold water to move the water pressure plate 14, which is different from the flange 142.

The water pressure plate 14 includes a packing 145 positioned at an area adjacent to the recirculation fluid passage 13 and formed of a material having elasticity. In other words, the packing 145 is provided at one end of the shaft 14. The packing 145 may be formed of a material, such as a rubber, having elasticity and may be disposed to cover a recirculation opening 1182 of the bimetal case 118 to be described below. As the packing 145 having elasticity makes contact with the recirculation opening 1182, the impact exerted on the recirculation opening 1182 may be reduced and the water tight of the recirculation fluid passage 13 may be maintained. The packing 145, which has the shape of a cylinder as illustrated in FIG. 3, may have an inner groove to surround one end of the shaft 141 such that the one end of the shaft 141 is inserted into and coupled to the packing 145, but the present disclosure is not limited thereto.

The water pressure plate 14 may further include an elastic member 15 connecting the water pressure plate 14 with the inner surface of the housing (10, 16, and 17). One end of the elastic member 15 is coupled to the water pressure plate 14 and an opposite end of the elastic member 15 is coupled to the inner surface of the housing (10, 16, and 17). According to an embodiment of the present disclosure, the elastic member is connected with the rear cover 17 constituting the housing (10, 16, and 17). The elastic member 15 may be a spiral spring, but the present disclosure is not limited thereto.

The elastic member 15 has a basic length, as the elastic member 15 is neither extended nor compressed when the cold water and the hot water are not used and the temperature of the hot water is equal to or greater than a reference temperature. When the length of the elastic member 15 is the basic length, a point, at which the water pressure plate 14 is positioned inside the cold water fluid passage 123, is referred to as a basic point. In other words, when the elastic member 15 satisfies the above condition, the elastic member 15 has the basic length, such that the water pressure plate 14 is positioned at the basic position. At the basic position, the packing 145 of the water pressure plate 14 does not close the recirculation fluid passage 13.

The elastic member 15 may be extended by force allowing the cold water to pressurize the water pressure plate 14 and move the water pressure plate 14 when the cold water is used. As the water pressure plate 14 moves in the opposite direction to the reference direction D, in which the opposite direction is a direction in which the water pressure plate 14 becomes closer to the recirculation fluid passage 13 by the water pressure of the cold water, the elastic member 15 having one end coupled to the water pressure plate 14 extends because the inner surface of the housing (10, 16, and 17) is not moved even though the opposite end of the elastic member 15 is coupled to the inner surface of the housing (10, 16, and 17). In addition, the elastic restoration force of the elastic member 15 is applied to the water pressure plate 14 in the reference direction D. Therefore, when the use of the cold water is terminated and the external force acting on the water pressure plate 14 other than the restoring force disappears or the remaining external forces are in equilibrium, the water pressure plate 14 may return to the basic position by the restoring force.

When the cold water and the hot water are not used, and when the temperature of the hot water is less than a reference temperature, as hot water, which is pressurized by the pump 431 (see FIG. 1) and thus is introduced into the cold water fluid passage 123 in the reference direction D along the recirculation fluid passage 13, pressurizes the water pressure plate 14, the elastic member 15 may be compressed by force allowing the water pressure plate 14 to move. Since the water pressure plate 14 moves in the reference direction D in which the water pressure plate 14 becomes farther apart from the recirculation fluid passage 13 due to the water pressure of the hot water, the elastic member 15 is compressed between the water pressure plate 14 and the inner surface of the housing (10, 16, and 17). Accordingly, the elastic restoring force of the elastic member 15 is applied to the water pressure plate 14 in the opposite direction to reference direction D. Therefore, when the water temperature of the hot water is equal to or greater than the reference temperature, so the flow rate of the hot water flowing along the recirculation fluid passage 13 is reduced, and the external force acting on the water pressure plate 14 other than the restoring force disappears or the remaining external forces are in equilibrium, the water pressure plate 14 may return to the basic position by the restoring force.

Bimetal Plate 119 and Bimetal Case 118

The bimetal plate 119 and the bimetal case 118 are further provided in the recirculation fluid passage 13 to adjust the flow rate of hot water flowing through the recirculation fluid passage 13. The bimetal plate 119 may be deformed depending on the water temperature of the hot water to adjust a sectional area of a fluid passage that the hot water flows through, such that the flow rate of hot water flowing through the recirculation fluid passage 13 when the water temperature of hot water is less than a reference temperature is greater than the flow rate of hot water passing through the recirculation fluid passage 13 when hot water having a water temperature is equal to or greater than the reference temperature.

The bimetal case 118 includes a diaphragm 1181 disposed to cross the recirculation fluid passage 13 and a recirculation opening 1182 formed in the diaphragm 1181 such that the hot water flows through the recirculation opening 1182. Thus, the diaphragm 1181 blocks the flow of the hot water, but the hot water may flow through the recirculation opening 1182. The diaphragm 1181 may cross the recirculation fluid passage 13 in a direction perpendicular to the reference direction D as illustrated in the drawings, but the direction in which the diaphragm 1181 is disposed is not limited thereto The bimetal case 118 may be fixed so as not to be further moved in the reference direction D as the bimetal case 118 is locked to a step 131 formed on the recirculation fluid passage 13. The housing body 10 and the outer surface of the bimetal case 118 are coupled to each other, and a case O-ring 1183 is interposed between the outer surface of the housing body 10 and the bimetal case 118.

The case O-ring 1183 may be interposed between the bimetal case 118 and the inner surface of the housing body 10, which forms the recirculation fluid passage 13. The case O-ring 1183, which may be formed of a material having elasticity, maintains the water tight between the bimetal case 118 and the inner surface of the housing body 10 to prevent hot water from leaking between the bimetal case 118 and the inner surface of the housing body 10.

An annular groove is formed in a side surface, which faces the bimetal plate 119, of the diaphragm 1181 while surrounding the recirculation opening 1182, and a contact O-ring 1184 may be disposed in the annular groove. The contact O-ring 1184 may be formed of an elastic material and disposed on a surface 1186 (hereinafter, referred to as a "reference-directional opposite surface of the bimetal case 118") opposite to a surface, which faces the reference direction D, of the bimetal case 118. Accordingly, even if the bimetal plate 119 covers and blocks the recirculation opening 1182, the impact may be absorbed and water tight may be maintained.

The reference-directional opposite surface of the bimetal case 118 may be formed therein with a reservoir 1185 recessed in the reference direction D such that hot water passing through a hole 1191 of the bimetal plate 119 stays in the reservoir 1185. Accordingly, the hot water passes through the holes 1191 of the bimetal plate 119 and is transferred to the reservoir 1185. Then, the hot water flows to the recirculation opening 1182 from the reservoir 1185 along the gap between the bimetal plate 119 and the reference-directional opposite surface 1186 of the bimetal case 118.

The diaphragm 1181 may further include a peripheral portion 1187 formed on the circumference of the diaphragm 1181 while extending in a direction opposite to the reference direction D, and the peripheral portion 1187 may be coupled to an end portion 162 of the front cover. As the outer surface of the end portion 162 of the front cover and the inner surface of the peripheral portion 1187 are formed to be shape-engaged with each other as illustrated in drawings, so the end portion 162 of the front cover is inserted into and coupled to the inner surface of the peripheral portion 1187.

A gap may be formed between the end portion 162 of the front cover and the reference-directional opposite surface of the diaphragm 1181, and the circumference of the bimetal plate 119 may be coupled and fixed into the gap. Since the circumference of the bimetal plate 119 is fixed, the central portion of the bimetal plate 119 is deformed other than the circumference of the bimetal plate 119, when the bimetal plate 119 is deformed.

The bimetal plate 119 is formed of bimetal, the shape of which is changed depending on the temperatures. The bimetal is a member formed as two metals having different thermal coefficients contact with each other and are coupled to each other at the ends of the two metals. The bimetal is changed in the bending direction and the bending degree thereof as two metals are stretched or contacted at mutually different ratios depending on the temperatures. Accordingly, the shape of the bimetal plate 119 may be changed depending on the temperature of the hot water flowing in the housing (10, 16, and 17) of the recirculation valve 1.

A plurality of holes 1191 are formed through an area, which is adjacent to the rim of the bimetal plate 119, of the bimetal plate 119 and spaced apart from each other by a specific distance. Accordingly, the hot water may flow through the bimetal plate 119 while passing through the holes 1191 and may flow from the hot water fluid passage 11 to the recirculation fluid passage 13. In detail, the diameter of each hole 1191 may be preferably 2.2 mm, and the number of holes 1191 may be eight. In addition, the diameter of the bimetal plate 119 may preferably be within the range of 23.7 mm and 23.8 mm, the thickness of the bimetal plate 119 may be 0.4 mm, and the maximum thickness may be 0.8 mm when the bimetal plate 119 is deformed.

The bimetal plate 119 is disposed to be spaced apart from the recirculation opening 1182. The distance between the bimetal plate 119 and the recirculation opening 1182 when the water temperature of the hot water is less than the reference temperature, is greater than the distance between the bimetal plate 119 and the recirculation opening 1182 when the water temperature of the hot water is equal to or greater than the reference temperature. Accordingly, the flow rate, which is able to flow between the bimetal plate 119 and the recirculation opening 1182 when the water temperature of the hot water is less than the reference temperature, is greater than the flow rate of hot water which is able to flow between the bimetal plate 119 and the recirculation opening 1182 when the water temperature of the hot water is equal to or greater than the reference temperature.

The distance between the bimetal plate 119 and the recirculation opening 1182 is greater than '0', when the water temperature of the hot water is equal to or greater than the reference temperature. When the water temperature of the hot water is equal to or greater than the reference temperature, the flow rate which is able to flow between the bimetal plate 119 and the recirculation opening 1182 may be a flow rate that not be sufficient to compress the elastic member 15 supporting the water pressure plate 14, may be a flow rate that is insufficient to operate the heat source 30, may be 2 L per minute, or may be 1.5 L or more per minute, but the present disclosure is not limited thereto.

The bimetal plate 119 may be curved in a convex shape toward the hot water fluid passage 11 from the cold water fluid passage 12, when the water temperature of the hot water is less than the reference temperature, and may be curved in a convex shape toward the cold water fluid passage 12 from the hot water fluid passage 11 when the water temperature of the hot water is greater than or equal to the reference temperature. As the bimetal plate 119 is deformed to have such a shape, the sectional area of a fluid passage allowing the hot water to flow may be adjusted between the bimetal plate 119 and the recirculation opening 1182. The following description will be made, with reference to drawings, regarding a manner allowing the hot water and the cold water to flow based on the operating states of the bimetal plate 119 and the water pressure plate 14 depending on the use of the cold water and the water temperature of the hot water.

Figure 4:
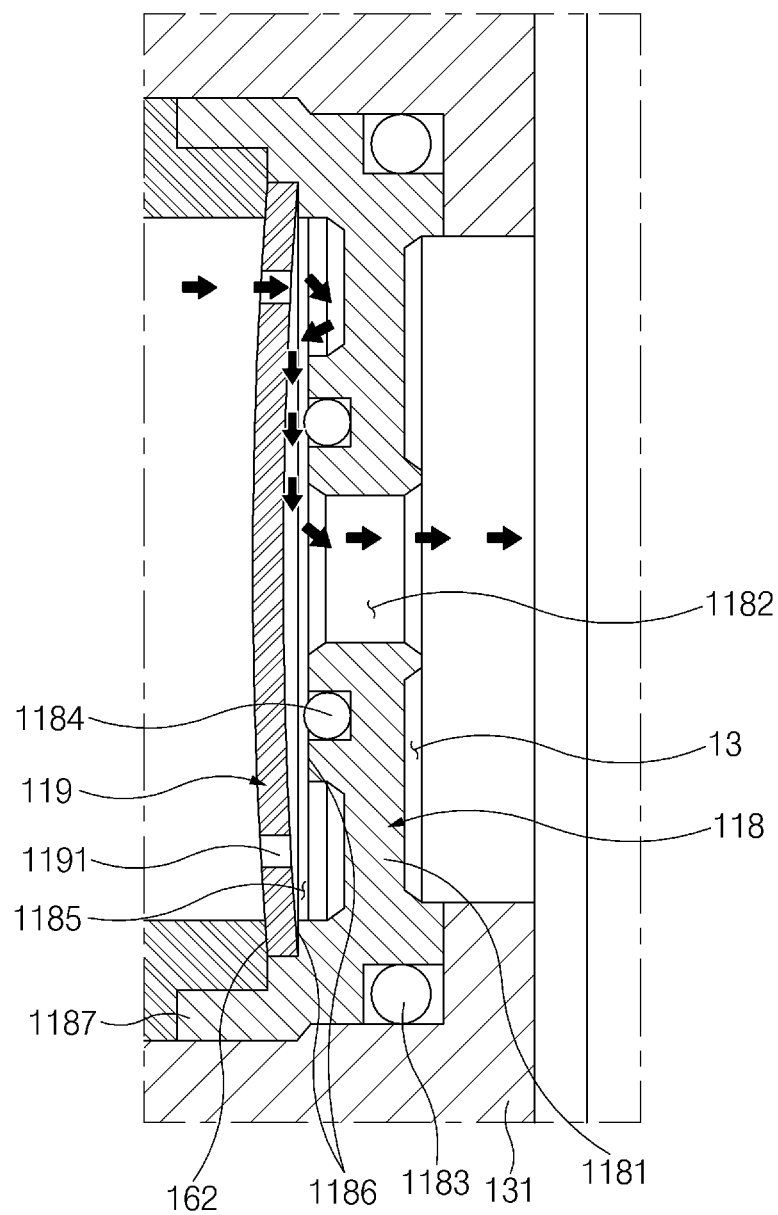
FIG. 4 is a longitudinal sectional view illustrating the shape of a bimetal plate of a recirculation valve when the water temperature of hot water is less than a reference temperature, according to an embodiment of the present disclosure.
Figure 5:
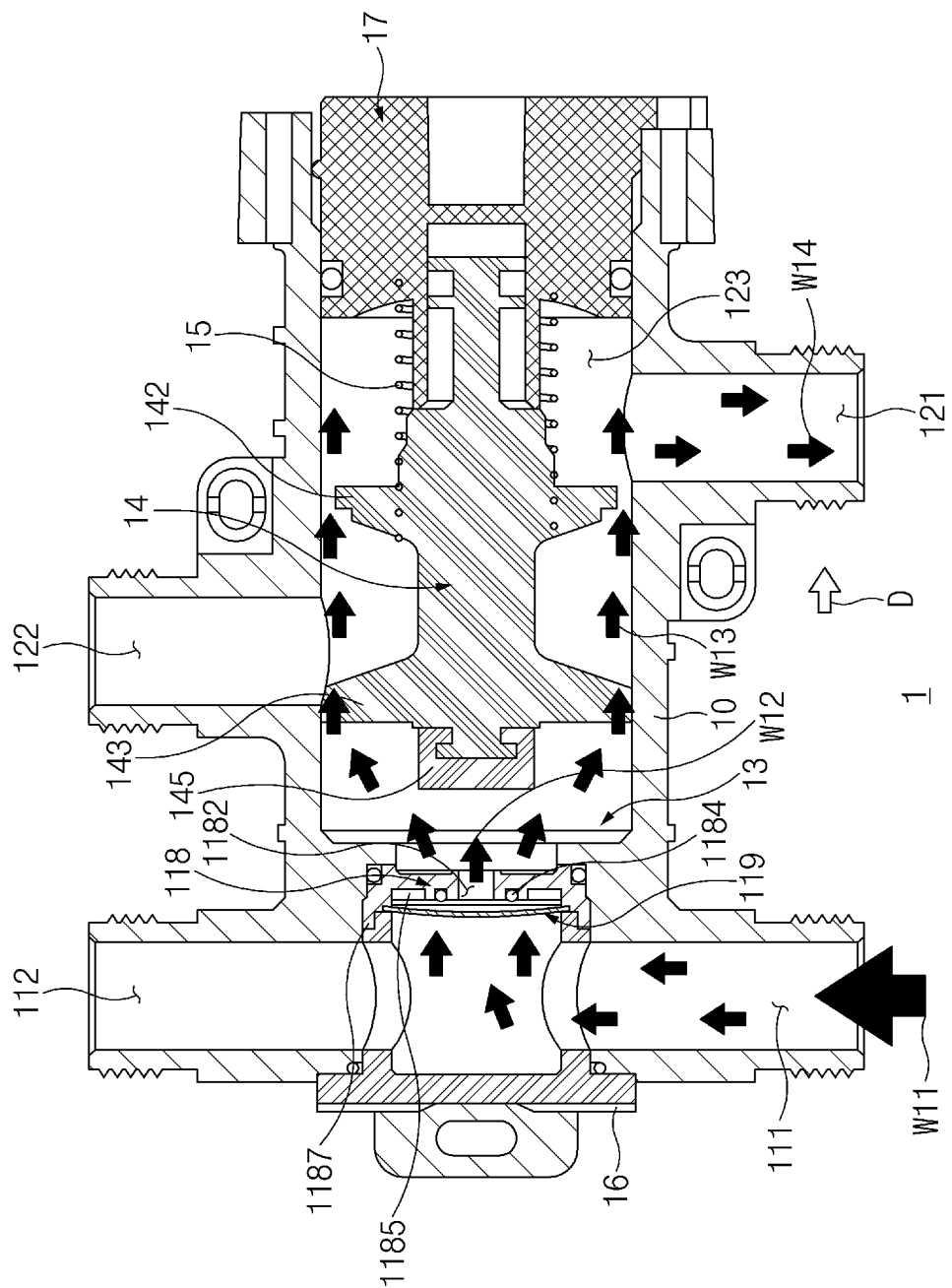
FIG. 5 is a longitudinal sectional view illustrating the state of a recirculation valve when the recirculation of hot water is completed and when the water temperature of the hot water is less than a reference temperature, according to an embodiment of the present disclosure.

Recirculation—When Water Temperature of Hot Water is Less Than Reference Temperature FIG. 4 is a longitudinal sectional view illustrating the shape of the bimetal plate 119 of the recirculation valve 1 when the water temperature of the hot water is less than the reference temperature, according to an embodiment of the present disclosure. FIG. 5 is a longitudinal sectional view illustrating the state of the recirculation valve 1, when the recirculation of the hot water is completed and when the temperature of the hot water is less than the reference temperature, according to an embodiment of the present disclosure.

Since a user adjusts a faucet to discharge hot water at a demand place 51 or not to discharge hot water and cold water, so the recirculation of the hot water is completed, the hot water is supplied to the inner part of the housing body 10 through the hot water supply pipe 41. Hot water W11 introduced into the hot water fluid passage 11 through the hot water supply passage 111 flows to the cold water intermediate passage 123 through the holes 1191 of the bimetal plate 119 and the recirculation opening 1182. Hot water W13 flowing through the cold water intermediate fluid passage 123 flows into the cold water supply fluid passage 121 through the gap G between the flange 142 and the housing body 10. The hot water W14 flowing through the cold water supply fluid passage 121 becomes returning water to return to the heat source 30. In this case, since the water temperature of the hot water is less than the reference temperature, the bimetal plate 119 may be deformed to have the shape in which the central portion of the bimetal plate 119 is convex in the opposite direction to the reference direction D.

In this situation, the flow rate of the hot water W12 passing through the bimetal plate 119 and the recirculation opening 1182 is a flow rate sufficient to compress the elastic member 15 by pressurizing the water pressure plate 14. The elastic member 15 is compressed to have a length shorter than a basic length due to the pressure of the hot water pressurizing the water pressure plate 14, thereby positioning the water pressure plate 14 at a point father apart from the recirculation fluid passage 13 than the basic position.

The elastic member 15 may return to have the basic length due to the elastic restoring force and to place the water pressure plate 14 at the basic position, when the water temperature of the hot water is greater than or equal to the reference temperature.

Figure 6:
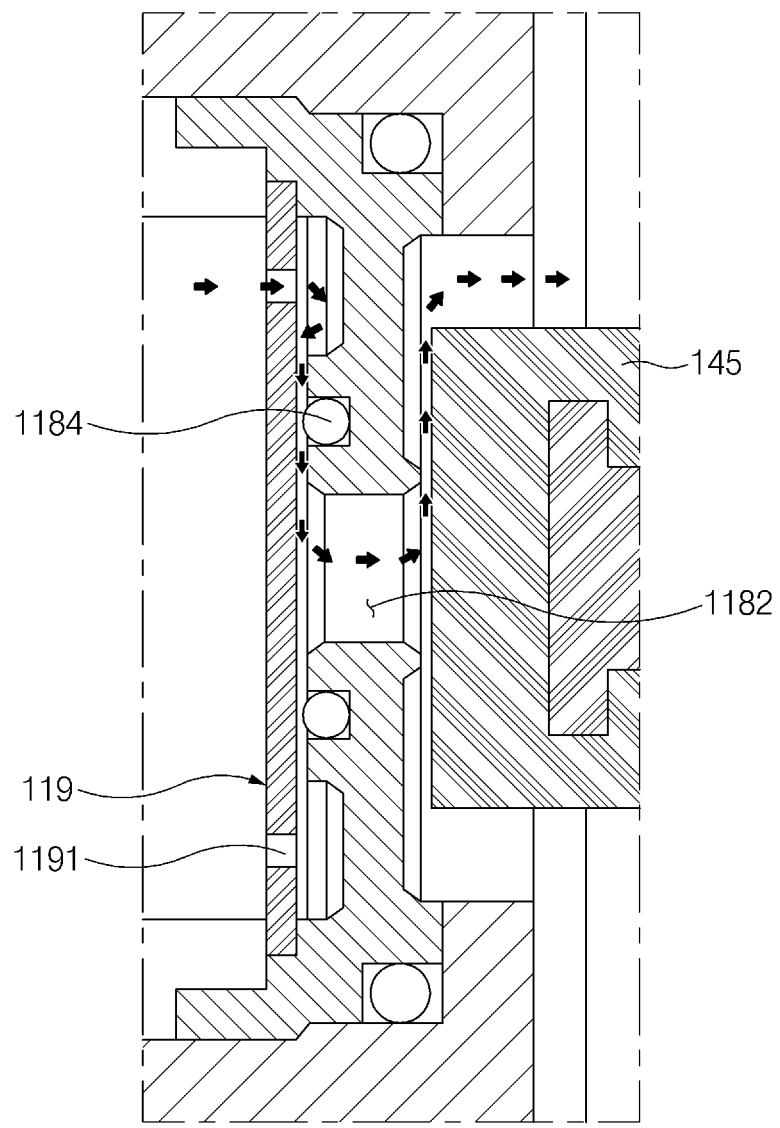
FIG. 6 is a longitudinal sectional view illustrating the shape of a bimetal plate of a recirculation valve when the water temperature of hot water is less than a reference temperature, according to an embodiment of the present disclosure.
Figure 7:
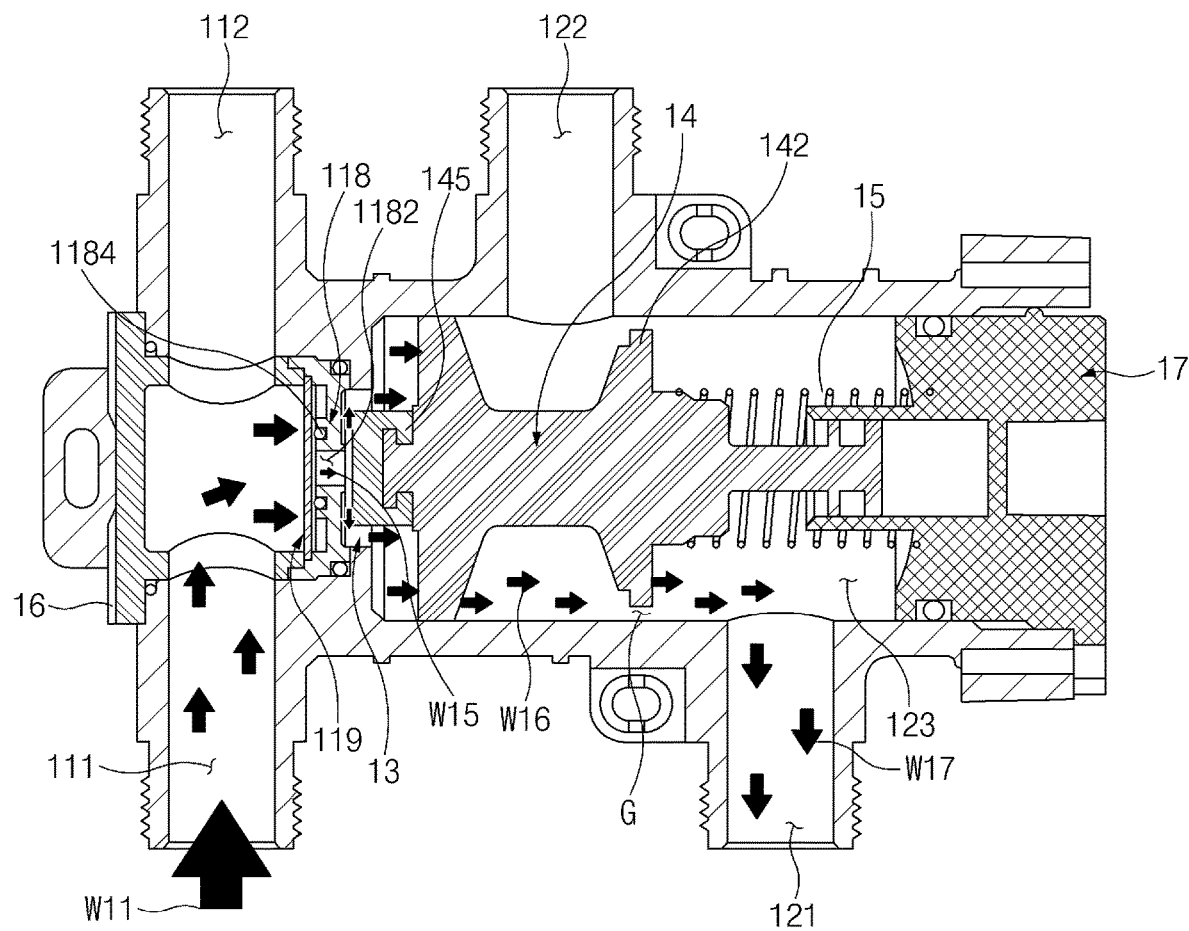
FIG. 7 is a longitudinal sectional view illustrating the state of a recirculation valve when the recirculation of hot water is completed and when the temperature of the hot water is equal to or greater than the reference temperature, according to an embodiment of the present disclosure.

Recirculation—When Water Temperature of Hot Water is Equal to or Greater Than Reference Temperature FIG. 6 is a longitudinal sectional view illustrating the shape of the bimetal plate 119 of the recirculation valve 1 when the water temperature of the hot water is equal to or greater than the reference temperature, according to an embodiment of the present disclosure. FIG. 7 is a longitudinal sectional view illustrating the state of the recirculation valve 1, when the recirculation of the hot water is completed and when the temperature of the hot water is equal to or greater than the reference temperature, according to an embodiment of the present disclosure.

Since the recirculation of the hot water is completed, the hot water W11 passes through the hot water supply pipe 41 and the hot water supply fluid passage 111, passes through the holes 1191 of the bimetal plate 119, passes through the recirculation opening 1182, and flows to the cold water intermediate fluid passage 123. The hot water, which is output through the recirculation fluid passage 13, flows to the cold water supply fluid passage 121 through the gap G, which is between the flange 142 and the housing body 10 in the cold water intermediate fluid passage 123, to become the returning water. In this case, since the water temperature of the hot water is equal to or greater than the reference temperature, the bimetal plate 119 may be deformed to have the shape in which the central portion of the bimetal plate 119 is convex in the reference direction D, or may be deformed to have a flat plate shape parallel to a direction perpendicular to the reference direction D. Therefore, the distance between the bimetal plate 119 and the reference-directional opposite surface 1186 of the bimetal case 118 is more narrowed as compared to when the water temperature of the hot water is less than the reference temperature. Accordingly, the flow rate of the hot water W15, which may flow through the recirculation opening 1182, is reduced, so the flow rate of the hot water W16 flowing through the cold water intermediate fluid passage 123, and the flow rate of the hot water W17 to be returning water after flowing through the cold water supply passage 121 are reduced. In this case, the flow rate of water, which is able to flow, has been described above.

An embodiment of the present disclosure has been described in that the shape of the bimetal plate 119 is deformed to be convex in the direction opposite to the reference direction D when the water temperature of the hot water is less than the reference temperature, and deformed to be the parallel plate shape when the water temperature of the hot water is equal to or greater than the reference temperature. To the contrary, the bimetal plate 119 may be deformed to have the parallel plate shape when the water temperature of the hot temperature is less than the reference temperature, and may be deformed to have the shape in which the bimetal plate 119 is convex in the reference direction D when the water temperature of the hot water is equal to or greater than the reference temperature.

When the water temperature of the hot water is equal to or greater than the reference temperature, and when the cold water and the hot water are not used, the flow rate of the hot water, which is able to flow through the recirculation fluid passage 13, may be less than a working flow rate to allow the heat source 30 to operate the heat source 30 to produce hot water by heating source water. In this case, the hot water is recirculated, but the unnecessary operation of the heat source 30 is stopped, so the hot water is not heated any more, thereby preventing water from being heated to be an excessive higher temperature.

In addition, when the cold water and hot water are not used and when the water temperature of the hot water is less than the reference temperature, the flow rate of the hot water may not be sufficient to compress the elastic member 15 supporting the water pressure plate 14, and may be equal to or less than 2 L per minute. Accordingly, under this condition, the elastic member 15 has a basic length, which is neither extended nor compressed, so the water pressure plate 14 is positioned at the basic position, and the recirculation fluid passage 13 is in an open state.

If the flow rate, which is able to flow through the recirculation fluid passage 13, becomes zero and the flow of the hot water is instantaneously blocked as the water temperature of the hot water becomes equal to or greater than the reference temperature and the bimetal plate 119 completely blocks the recirculation opening 1182, the pressure at which the pump 431 pressurizes the hot water is instantaneously applied to the bimetal plate 119, and the inertia of the hot water flowing through the hot water fluid passage 11 is directly transmitted to the bimetal plate 119, thereby causing a water hammer phenomenon, and adversely affecting the durability of the recirculation valve 1 and the bimetal plate 119.

However, according to an embodiment of the present disclosure, water leaks in a specific amount to flow along the bimetal plate 119 and the recirculation fluid passage 13 in the specific amount even when the water temperature of the hot water is equal to or greater than the reference temperature. Accordingly, pressure applied to the bimetal plate 119 may be dispersed and the water hammer phenomenon may be reduced. Accordingly, the whole durability of the recirculation valve 1 and the bimetal plate 119 may be improved.

Use of Cold water

Figure 8:
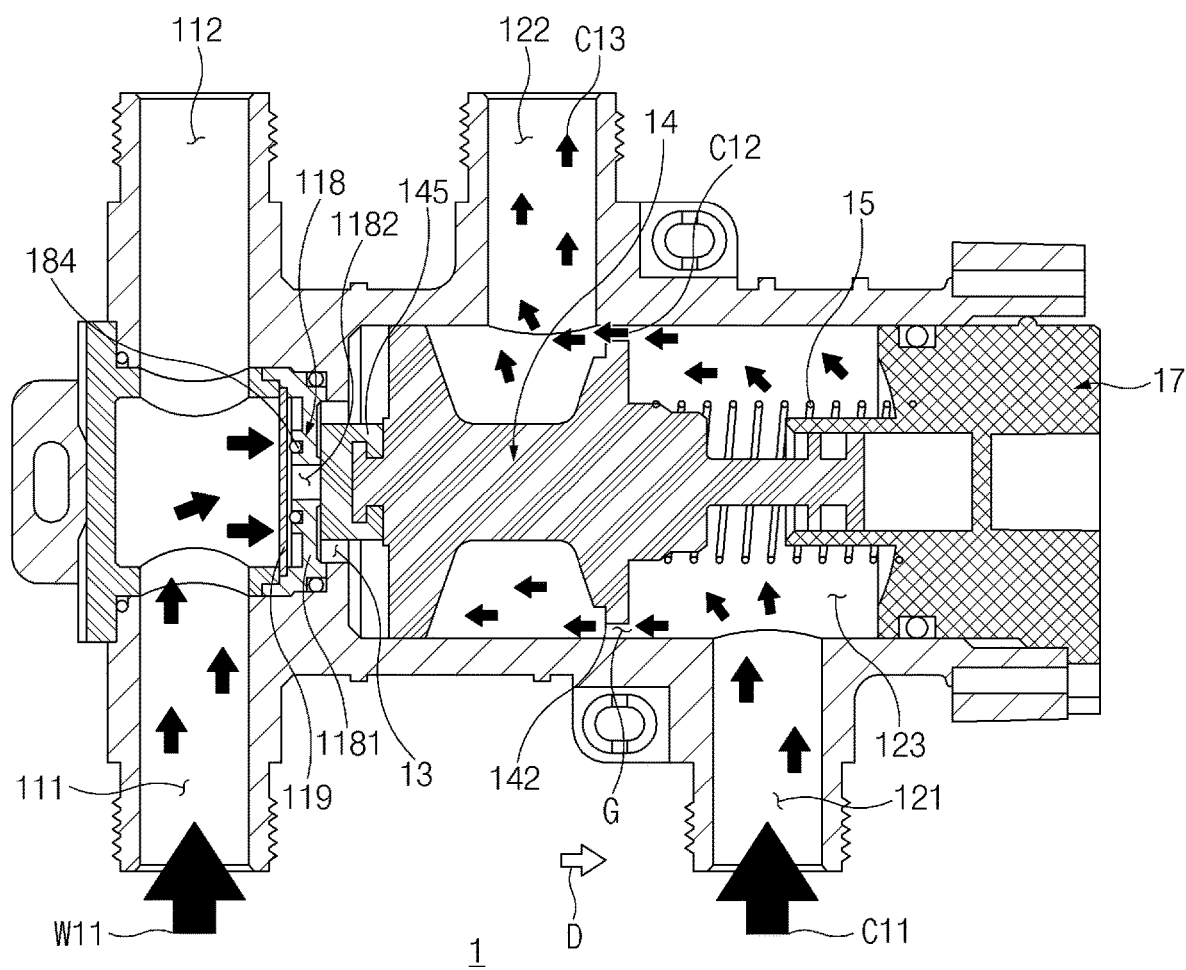
FIG. 8 is a longitudinal sectional view illustrating the state of a recirculation valve, when cold water is used, according to an embodiment of the present disclosure.

FIG. 8 is a longitudinal sectional view illustrating the state of the recirculation valve 1, when cold water is used, according to an embodiment of the present disclosure.

When the user uses cold water by adjusting the faucet of the demand place 51, cold water C11 is supplied to the cold water fluid passage 12 through the cold water supply pipe 42. The cold water C11 is introduced into the housing body 10 through the cold water supply passage 121, and cold water C12 passes through the gap G formed between the inner surface of the housing body 10 and the outer surface of the flange 142 in the cold water intermediate fluid passage 123. Cold water C13 obtained through the cold water intermediate fluid passage 123 flows to the cold water discharge fluid passage 122. Since the cold water flows inside the cold water intermediate fluid passage 123 in the opposite direction to the reference direction D, the flange 142 of the water pressure plate 14 is pressurized in the opposite direction to the reference direction D. The elastic member 15 is extended from the basic length due to the pressure of the cold water pressurizing the water pressure plate 14 when the cold water is used, thereby positioning the water pressure plate 14 at a point closer to the recirculation fluid passage 13 than the basic position. As the recirculation fluid passage 13 is closed, hot water W11 may not pass through the recirculation fluid passage 13. Therefore, cold water and hot water is not mixed, and the hot water is not recirculated during the use of cold water.

When the use of the cold water is stopped, the elastic member 15 returns to have the basic length due to the elastic restoring force such that the water pressure plate 14 is placed at the basic position again. Accordingly, the hot water may be recirculated.

Hereinafter, the configuration of the recirculation valve 2 will be described with reference to FIGS. 9 and 10 according to another embodiment of the present disclosure.

Figure 9:
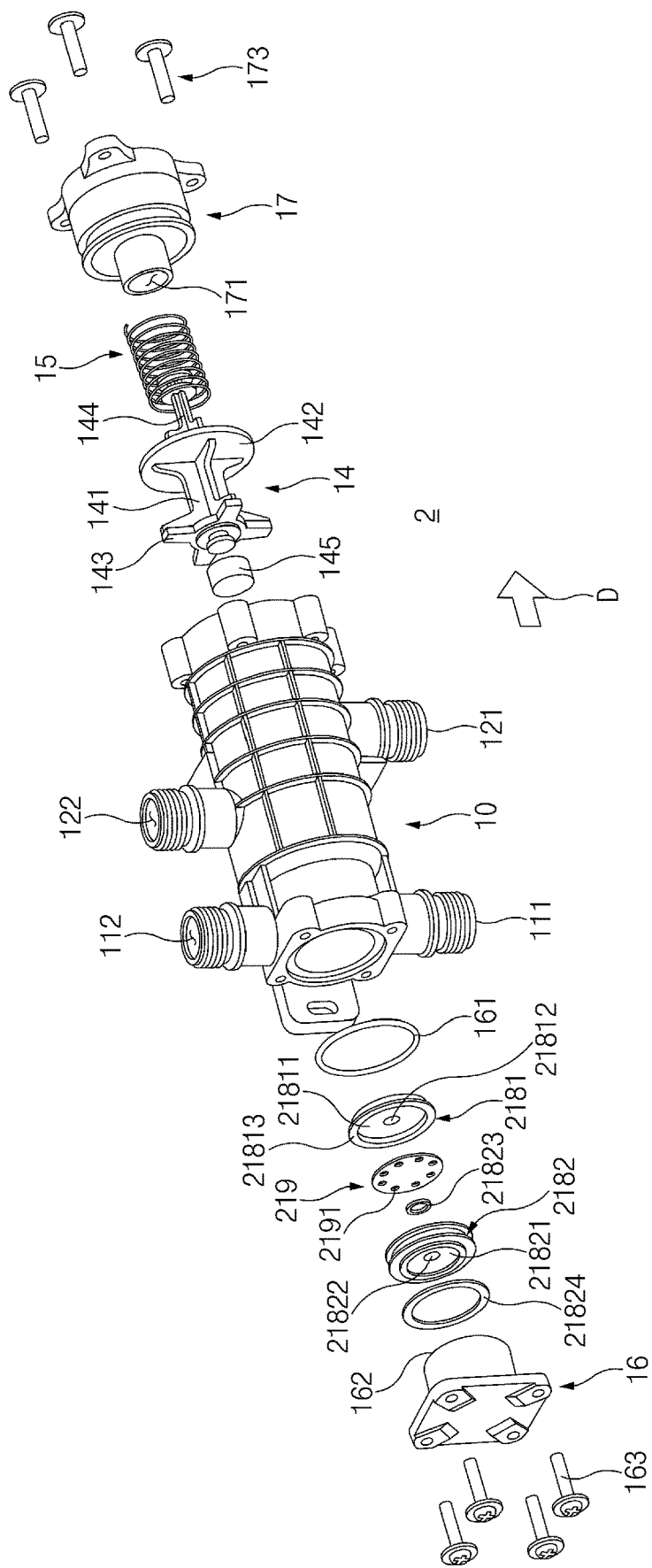
FIG. 9 is an exploded perspective view of a recirculation valve, according to another embodiment of the present disclosure.

FIG. 9 is an exploded perspective view of a recirculation valve 2, according to another embodiment of the present disclosure. FIG. 10 is a longitudinal sectional view of the recirculation valve 2, according to another embodiment of the present disclosure.

Figure 10:
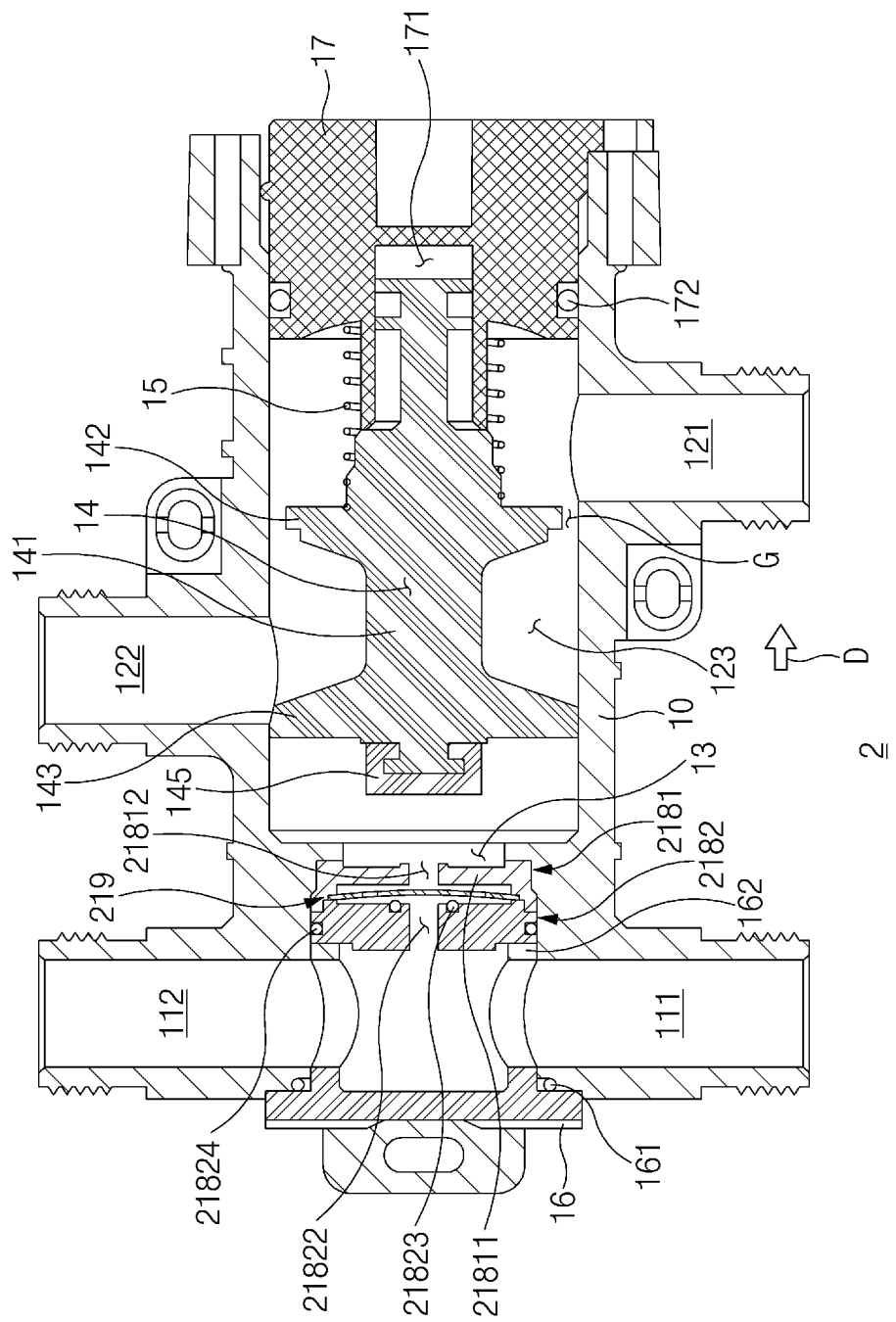
FIG. 10 is a longitudinal sectional view of a recirculation valve, according to another embodiment of the present disclosure.

Referring to FIGS. 9 and 10, according to another embodiment of the present disclosure, the recirculation valve 2 includes the housing (10, 16, and 17), the water pressure plate 14, and a bimetal plate 219. In addition, the recirculation valve 2 may further include a bimetal case 2182 and an inner case 2181.

The description of components of the recirculation valve according to another embodiment of the present disclosure is similar to the description of components of the recirculation valve according to an embodiment of the present disclosure. Accordingly, the following description will be made while focusing on additional components.

The front cover 16 is detachably coupled to the housing (10, 16, and 17) such that the assembling and the replacement of the bimetal plate 219, the bimetal case 2182, and the inner case 2181 which are to be described below, are easily performed The front cover 16 may be coupled to the housing body 10 using a front coupling member 163. The front coupling member 163 may be a bolt, and a plurality of front coupling members 163 may be provided. As the front coupling member 163 is coupled to a coupling hole of the housing body 10 and a coupling hole formed in the front cover 16, the front cover 16 and the housing body 10 may be coupled to each other.

The rear cover 17 may be coupled to the housing body 10 using a rear coupling member 173. The rear coupling member 173 may be a bolt, and a plurality of rear coupling members 173 may be provided. As the rear coupling member 173 is coupled to a coupling hole of the housing body 10 and a coupling hole formed in the rear cover 17, the rear cover 17 and the housing body 10 may be coupled to each other.

The bimetal plate 219 and the bimetal case 2182 to be described below may be disposed in the recirculation fluid passage 13.

According to a modification of another embodiment, the basic position at which the water pressure plate 14 may be placed by the elastic member 15 may be a point at which the water pressure plate 14 closes the recirculation passage 13.

The elastic member 15 may be extended by force allowing the cold water to pressurize the water pressure plate 14 and move the water pressure plate 14 when the cold water or hot water is used. As the water pressure plate 14 moves in the opposite direction to the reference direction D, in which the opposite direction is a direction in which the water pressure plate 14 becomes closer to the recirculation fluid passage 13 by the water pressure of the cold water, the elastic member 15 having one end coupled to the water pressure plate 14 is extended because the inner surface of the housing (10, 16, and 17) is not moved even though the opposite end of the elastic member 15 is coupled to the inner surface of the housing (10, 16, and 17). In addition, the elastic restoration force of the elastic member 15 is applied to the water pressure plate 14 in the reference direction D. Therefore, when the use of cold water is terminated and the external force acting on the water pressure plate 14 other than the restoring force disappears or the remaining external forces are in equilibrium, the water pressure plate 14 may return to the basic position by the restoring force.

The elastic member 15 may be compressed by force allowing the water pressure plate 14 to move, as hot water introduced into the cold water fluid passage 123 pressurizes the water pressure plate 14 in the reference direction D along the recirculation fluid passage 13, when the cold water and the hot water are not used, and when the temperature of the hot water is less than a reference temperature. Since the water pressure plate 14 moves in the reference direction D in which the water pressure plate 14 becomes farther apart from the recirculation fluid passage 13 due to the water pressure of the hot water, the elastic member 15 is compressed between the water pressure plate 14 and the inner surface of the housing (10, 16, and 17). Accordingly, the elastic restoration force of the elastic member 15 is applied to the water pressure plate 14 in the opposite direction to the reference direction D. Therefore, the water pressure plate 14 may return to the basic position by the restoring force, when the water temperature of the hot water is equal to or greater than the reference temperature, so the flow rate of the hot water flowing along the recirculation fluid passage 13 is reduced, and the external force acting on the water pressure plate 14 other than the restoring force disappears or the remaining external forces are in equilibrium.

Bimetal Case 2182

The bimetal case 2182 includes a diaphragm 21821 disposed to cross the recirculation fluid passage 13 and a recirculation opening 21822 formed in the diaphragm 21821 such that the hot water flows through the recirculation opening 21822. Accordingly, although the diaphragm 21821 may block the flow of the hot water, the hot water may flow through the recirculation opening 21822. Although the diaphragm 21821 may cross the recirculation passage 13 in a direction perpendicular to the reference direction D as illustrated in the drawings, but the direction in which the diaphragm 2181 is disposed is not limited thereto.

The housing body 10 and the outer surface of the bimetal case 2182 are coupled to each other, and a case O-ring 21824 is interposed between the outer surface of the housing body 10 and the bimetal case 2182. The case O-ring 21824, which may be formed of a material having elasticity, maintains water tight between the bimetal case 2182 and the inner surface of the housing body 10 to prevent water from leaking from the boundary between the bimetal case 2182 and the inner surface of the housing body 10.

An annual groove is formed in a surface, which faces the bimetal plate 219, of the diaphragm 21821 while surrounding the recirculation opening 21822, so a contact O-ring 21823 may be disposed in the groove. A contact O-ring 21823 may be formed of a material having elasticity and disposed on a side surface, which faces the reference direction D, of the bimetal case 2182. Accordingly, even if the bimetal plate 219 covers and blocks the recirculation opening 21822, the impact may be absorbed and water tight may be maintained.

An end portion 162 of the front cover may make contact with a surface opposite to a surface, which faces the reference direction D, of the bimetal case 2182. Accordingly, as the front cover 16 is fitted into the housing body 10, the end portion 162 of the front cover may be coupled to the housing body 10 while pressurizing the bimetal case 2182.

The bimetal plate 219 is disposed adjacent to the side surface of the bimetal case 2182, which faces the cold water flow fluid passage 12, of side surfaces of the bimetal case 2182. In other words, the bimetal plate 219 is positioned at the side surface, which faces the reference direction D, of the bimetal case 2182. The bimetal case 2182 is positioned closer to the hot water fluid passage 11 than the inner case 2181 to be described.

Inner Case 2181

The inner case 2181 may be disposed in the recirculation fluid passage 13. The inner case 2181 is a component positioned downstream from the positions of the bimetal case 2182 and the bimetal plate 219 in the reference direction D.

The basic component of the inner case 2181 may include an inner diaphragm 21811 and an inner opening 21812, which is similar to the basic component of the bimetal case 2182. The inner diaphragm 21811 is a plate disposed to cross the recirculation fluid passage 13 and the inner opening 21812 is an opening formed in the inner diaphragm 21811 such that the hot water flows through the inner opening 21812. In other words, a fluid passage allowing the flow of hot water in the recirculation fluid passage 13 may be formed by the recirculation opening 21822 of the bimetal case 2182 and the inner opening 21812 of the inner case 2181.

The inner diaphragm 21811 may further include a peripheral portion 21813 formed on the circumference of the inner diaphragm 21811 while extending in a direction opposite to the reference direction D, and the peripheral portion 21813 may be coupled to the side surface, which faces the reference direction D, of the bimetal case 2182. The side surface, which faces the reference direction D, of the bimetal case 2182 and the inner surface of the peripheral portion 21813 are formed to be shape-engaged with each other. Accordingly, a portion, which protrudes in the reference direction D, of the side surface of the bimetal case 2182, which faces the reference direction D, is inserted into and coupled to the peripheral portion 21813.

A gap may be formed between the peripheral portion 21813 and the side surface, which faces the reference direction D, of the diaphragm 2182, and the circumference of the bimetal plate 219 may be coupled and fixed to the gap. Since the circumference of the metal plate 219 is fixed, the central portion of the bimetal plate 219 is deformed other than the circumference of the bimetal plate 219, when the bimetal plate 219 is deformed The inner case 2181 may be fixed so as not to be further moved in the reference direction D as the inner case 2181 is locked to a step 131 formed radially inward from the recirculation fluid passage 13

The water pressure plate 14 is separated from the inner opening 21812 to open the inner opening 21812 when the hot water is recirculated, and contact the inner opening 21812 to close the inner opening 21812 when cold water or hot water is used.

The inner case 2181 is disposed closer to the cold water passage 12 than the bimetal case 2182 and the bimetal plate 219. Accordingly, as illustrated in the drawing, the bimetal case 2182 and the inner case 2181 may be disposed at opposite points while interposing the bimetal plate 219 between the bimetal case 2182 and the inner case 2181. Accordingly, the structure of surrounding the bimetal plate 219 by the bimetal case 2182 and the inner case 2181 is formed.

Bimetal Plate 219

The bimetal plate 219 is further provided in the recirculation fluid passage 13. As the bimetal plate 219 is deformed depending on the water pressure of the hot water, the bimetal plate 219 may open the recirculation fluid passage 13 when the water temperature of the hot water is less than the reference temperature, and may close the recirculation fluid passage 13 when the water temperature of the hot water is equal to or greater than the reference temperature. The bimetal plate 219 is formed of bimetal, the shape of which is changed depending on the temperatures A plurality of holes 2191 are formed through an area, which is adjacent to the rim of the bimetal plate 219, of the bimetal plate 219 and spaced apart from each other by a specific distance. Accordingly, the hot water flowing through the recirculation opening 21822 may pass through the bimetal plate 219 through the holes 2191 and may flow from the hot water fluid passage 11 to the inner opening 21812. The hot water transferred through the inner opening 21812 is discharged to the cold water fluid passage 123.

The bimetal plate 219 is disposed to be spaced apart from the recirculation opening 21822 when the water temperature of the hot water is less than the reference temperature. When the water temperature of the hot water is equal to or greater than the reference temperature, the bimetal plate 219 makes contact with the recirculation opening 21822, which is a section of the recirculation fluid passage 13, to close the recirculation opening 21822. In detail, when the water temperature of the hot water is less than the reference temperature, the bimetal plate 219 is deformed to be separated from the contact O-ring 21823 surrounding the recirculation opening 21822. When the water temperature of the hot water is equal to or greater than the reference temperature, the bimetal plate 219 is deformed to make contact with the contact O-ring 21823. Accordingly, the bimetal plate 219 opens the recirculation fluid passage 13 when the water temperature of the hot water is less than the reference temperature, and closes the recirculation fluid passage 13 when the water temperature of the hot water is equal to or greater than the reference temperature.

The following description will be made while focusing on the deformation shape of the bimetal plate 219. When the water temperature of the hot water is less than the reference temperature, the bimetal plate 219 may be curved in the convex shape toward the cold water fluid passage 12 from the hot water fluid passage 11, that is, in the convex shape in the reference direction D. To the contrary, when the water temperature of the hot water is equal to or greater than the reference temperature, the bimetal plate 219 may be curved in the convex shape toward the hot water fluid passage 11 from the cold water fluid passage 12, that is, in the convex shape in a direction opposite to the reference direction D. As the bimetal plate 219 is deformed to have such a shape, a fluid passage may be formed such that hot water flows between the bimetal plate 219 and the recirculation opening 21822. When the water temperature of the hot water is equal to or greater than the reference temperature, the central portion of the bimetal plate 219 is closer to the contact O-ring 21823 to make contact to the contact O-ring 21823 and to close the recirculation opening 21822.

However, the bimetal plate 219 is convex in the reference direction D when the water temperature of the hot water is less than the reference temperature, and is deformed to have a flat plate shape perpendicular to the reference direction D to close the recirculation opening 21822, when the water temperature of the hot water is equal to or greater than the reference temperature. Hereinafter, the deformation of the bimetal plate 219 will be described with reference to FIGS. 13 and 14 which are drawings for illustrating another embodiment of the present disclosure.

The following description will be made, with reference to drawings, regarding a manner of allowing the hot water and the cold water to flow based on the operating states of the bimetal plate 119 and the water pressure plate 14 depending on the use of the hot water or the cold water and the water temperature of the hot water.

Figure 11:
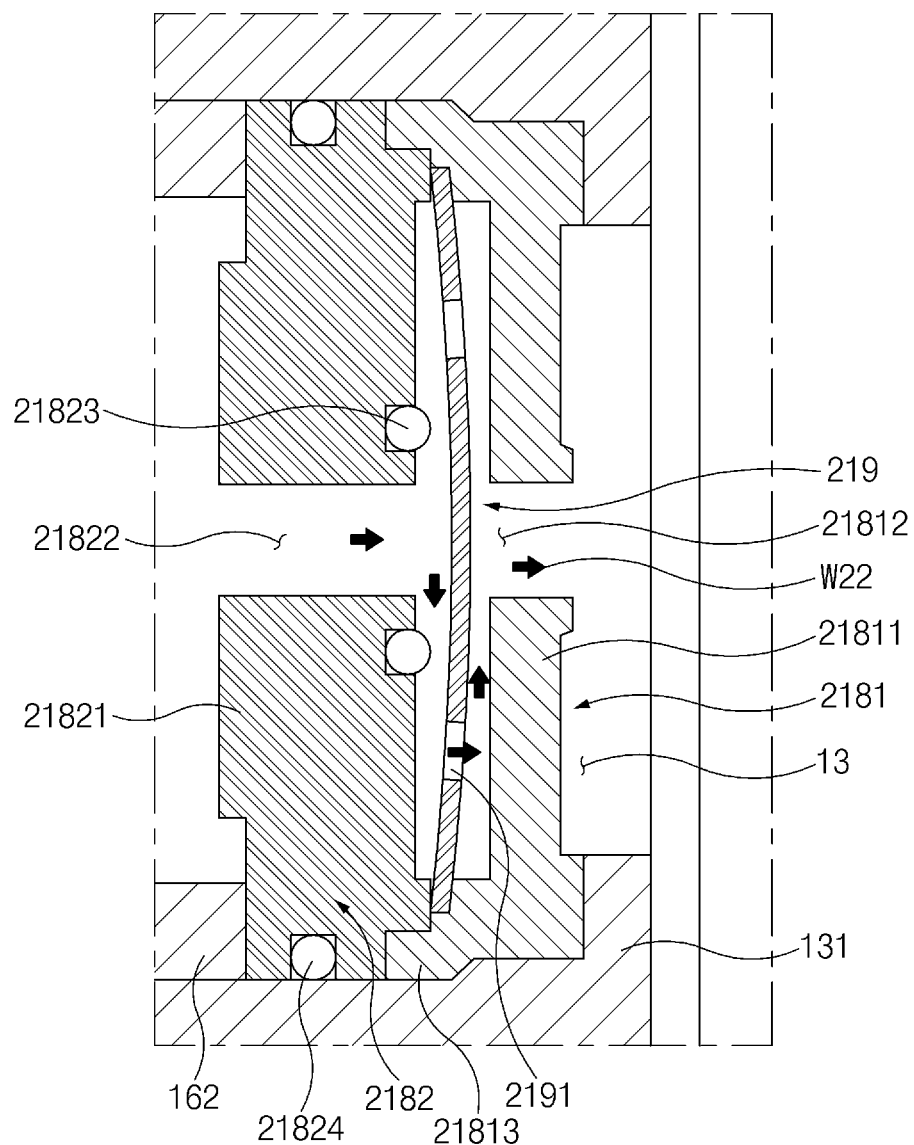
FIG. 11 is a longitudinal sectional view illustrating the shape of a bimetal plate of a recirculation valve when the water temperature of hot water is less than a reference temperature, according to another embodiment of the present disclosure.
Figure 12:
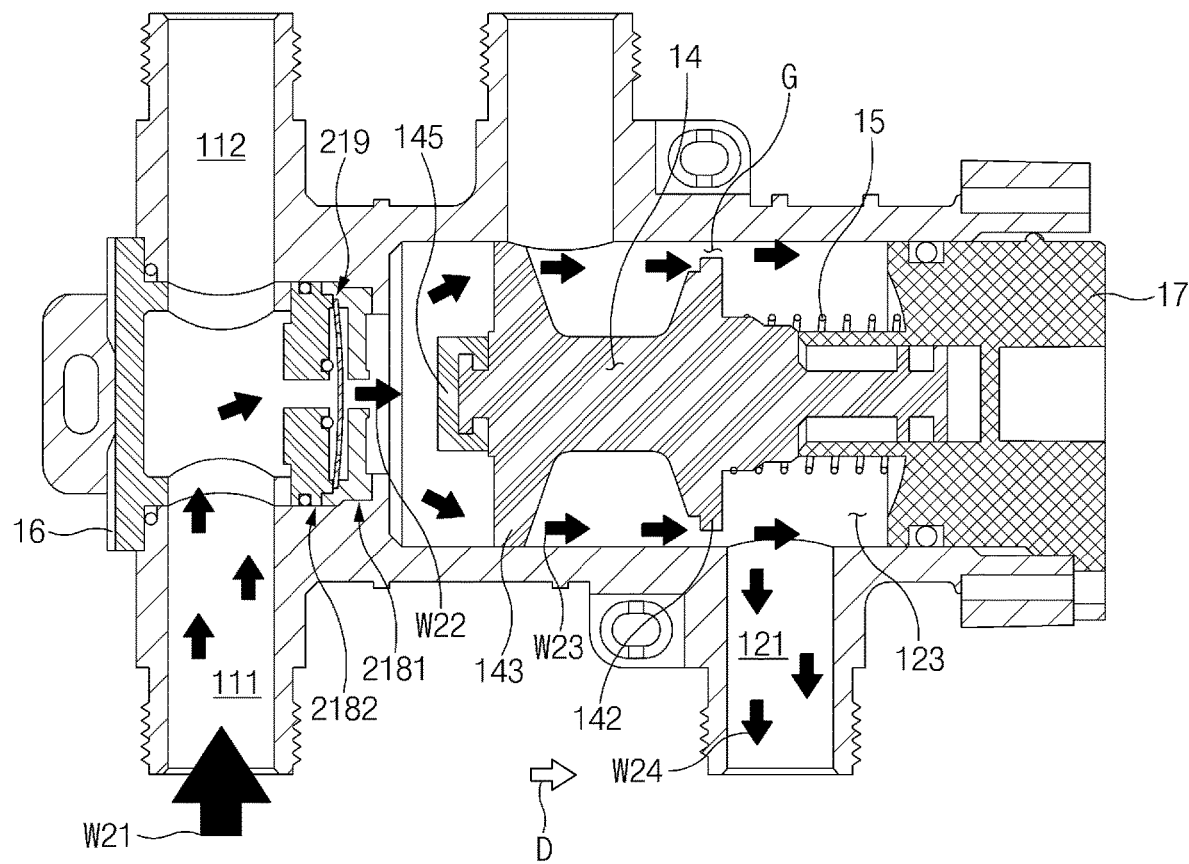
FIG. 12 is a longitudinal sectional view illustrating the state of a recirculation valve when the recirculation of hot water is completed and when the temperature of the hot water is less than a reference temperature, according to another embodiment of the present disclosure.

Water Temperature of Hot Temperature Less Than Reference Temperature, and Cold Water and Hot Water Not Used FIG. 11 is a longitudinal sectional view illustrating the shape of the bimetal plate 219 of the recirculation valve 2 when the water temperature of the hot water is less than the reference temperature, according to another embodiment of the present disclosure. FIG. 12 is a longitudinal sectional view illustrating the state of the recirculation valve 2 when the recirculation of the hot water is completed and when the temperature of the hot water is less than the reference temperature, according to an embodiment of the present disclosure.

In the state that a user adjusts a faucet to discharge hot water at the demand place 51 or not to discharge hot water and cold water, so the recirculation of the hot water is completed, the hot water is supplied to the inner part of the housing body 10 through the hot water supply pipe 41. Hot water W21 introduced into the hot water fluid passage 11 through the hot water supply passage 111 flows to the cold water intermediate passage 123 through the holes 2191 of the bimetal plate 219 and the inner opening 2182. Hot water W23 flowing through the cold water intermediate fluid passage 123 flows into the cold water supply fluid passage 121 through a gap G between the flange 142 and the housing body 10. Hot water W24 flowing through the cold water supply fluid passage 121 becomes returning water to return to the heat source 30. In this case, since the water temperature of the hot water is less than the reference temperature, the bimetal plate 219 may be deformed to have the shape in which the central portion of the bimetal plate 219 is convex in the reference direction D.

In this situation, the flow rate of the hot water W22 passing through the bimetal plate 219 and the recirculation opening 21822 is a flow rate sufficient to compress the elastic member 15 by pressurizing the water pressure plate 14. The elastic member 15 is compressed to have a length shorter than a basic length due to the pressure of the hot water pressurizing the water pressure plate 14, thereby positioning the water pressure plate 14 at a point father apart from the recirculation fluid passage 13 than the basic position.

When the water temperature of the hot water is equal to or greater than the reference temperature, the water pressure may be reduced due to the hot water. In this case, the elastic member 15 may return to have the basic length due to the elastic restoring force and to place the water pressure plate 14 at the basic position.

Figure 13:
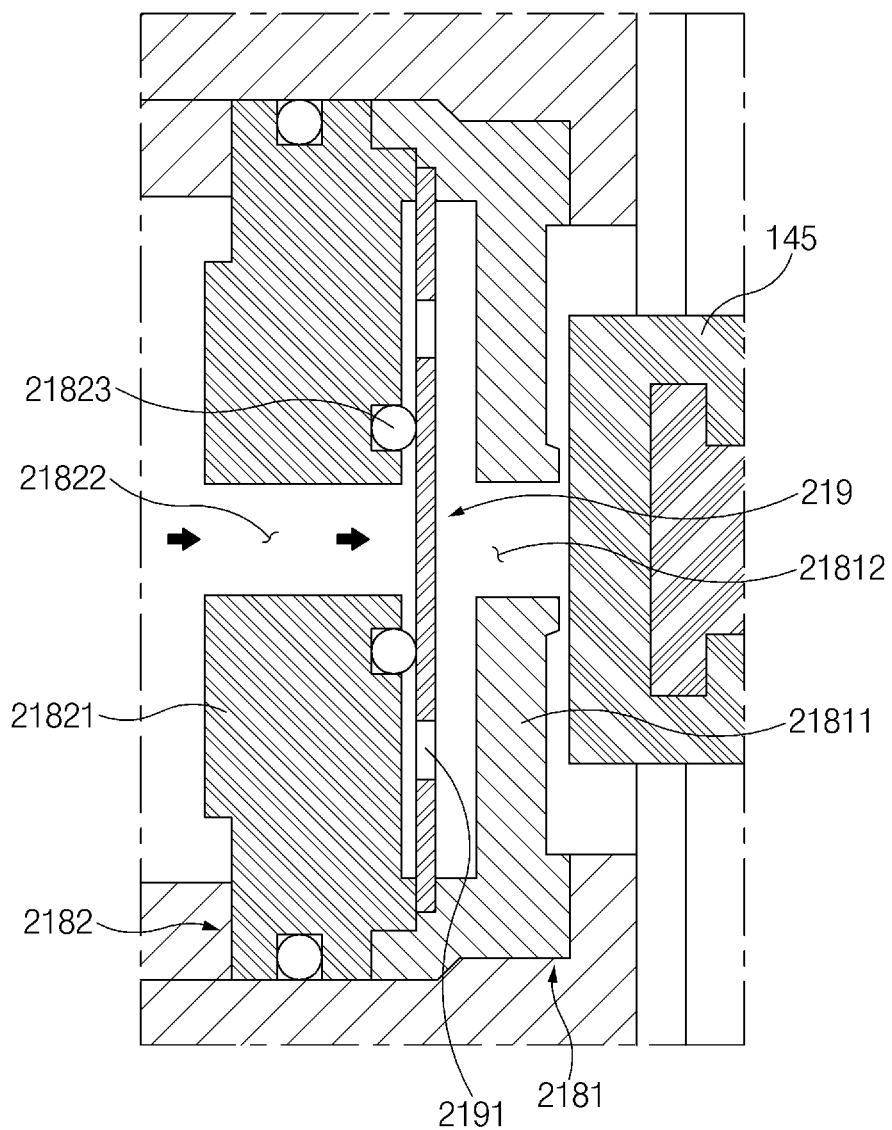
FIG. 13 is a longitudinal sectional view illustrating the shape of a bimetal plate of a recirculation valve when the water temperature of hot water is equal to or greater than the reference temperature, according to another embodiment of the present disclosure.
Figure 14:
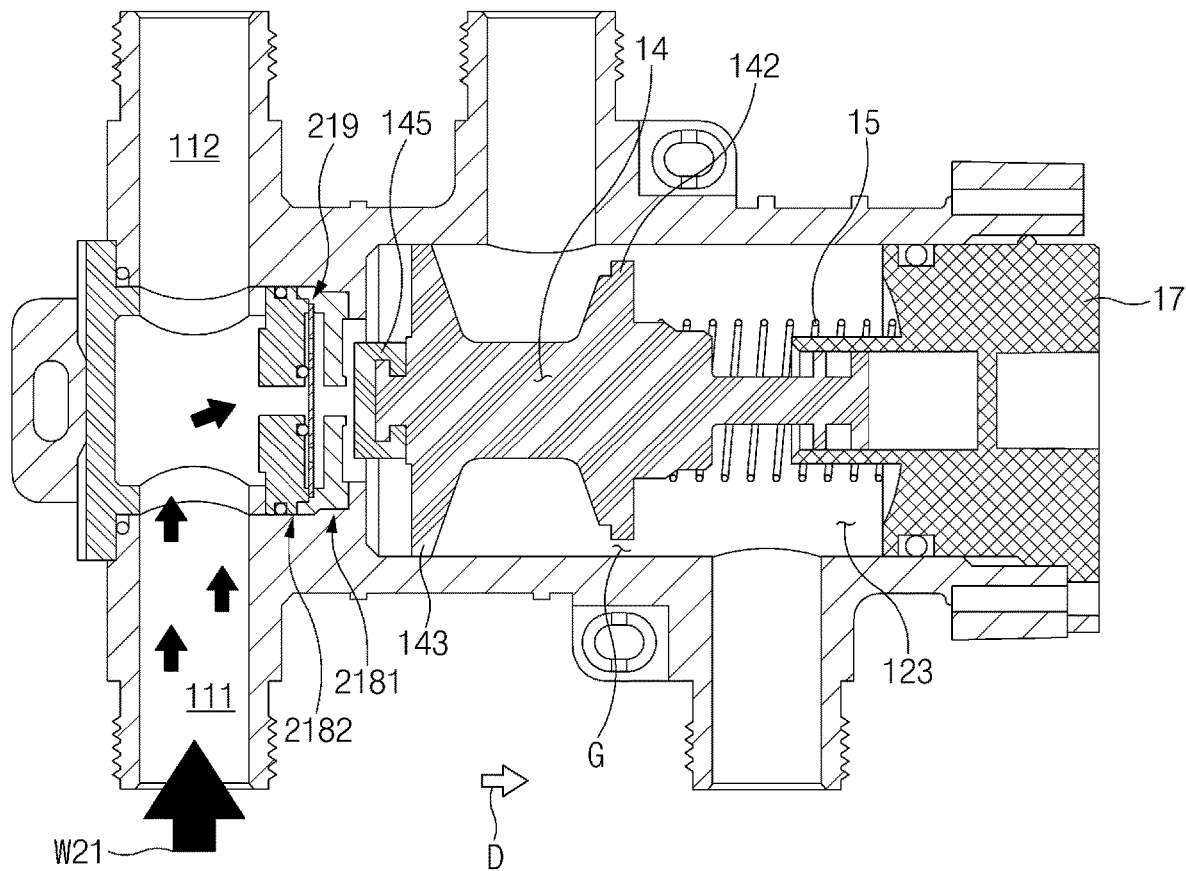
FIG. 14 is a longitudinal sectional view illustrating the state of a recirculation valve when the recirculation of hot water is completed and when the temperature of the hot water is equal to or greater than a reference temperature, according to another embodiment of the present disclosure.

Water Temperature of Hot Temperature Equal to or Greater Than Reference Temperature FIG. 13 is a longitudinal sectional view illustrating the shape of the bimetal plate 219 of the recirculation valve 2 when the water temperature of the hot water is equal to or greater than the reference temperature, according to another embodiment of the present disclosure. FIG. 14 is a longitudinal sectional view illustrating the state of the recirculation valve 2 when the recirculation of the hot water is completed and when the temperature of the hot water is equal to or greater than the reference temperature, according to another embodiment of the present disclosure.

Since the water temperature of the hot water W21 is equal to or greater than the reference temperature, the central portion of the bimetal plate 219 is deformed in a direction opposite to the reference direction D such that the central portion of the bimetal plate 219 is closer to the contact O-ring 21823 to make contact with the contact O-ring 21823. Accordingly, the bimetal plate 219 may be deformed to have the shape in which the central portion of the bimetal plate 219 is convex in the opposite direction to the reference direction D.

As the bimetal plate 219 is deformed as described above, the central portion of the bimetal plate 219 makes contact with the contact O-ring 21823 to close the recirculation opening 21822. Accordingly, the hot water introduced into the recirculation fluid passage 13 fails to approach the holes 2191 of the bimetal plate 219 and fails to be transferred to the cold water intermediate fluid passage 123 along the recirculation fluid passage 13.

As illustrated in the drawings, according to another embodiment of the present disclosure, the bimetal plate 219 is deformed to have the convex shape in the reference direction D to open the recirculation opening 21822 when the water temperature of the hot water is less than the reference temperature, and become in a flat plate shape to close the recirculation opening 21822 when the water temperature of the hot water is equal to or greater than the reference temperature.

When the recirculation opening 21822 is closed, so there is absent hot water transmitted to the water pressure plate 14, the elastic member 15 has the basic length, which is neither extended nor compressed, so the water pressure plate 14 is positioned at the basic position.

Referring to FIGS. 11 to 14, according to another embodiment of the present disclosure, the bimetal plate 219 of the recirculation valve 2 is positioned at the side surface, which faces the reference direction D, of the bimetal case 2182. In addition, when the water temperature of the hot water is equal to or greater than the reference temperature, the central portion of the bimetal plate 219 is deformed to move in the opposite direction to the reference direction D to close the recirculation opening 21822. Accordingly, on the central portion of the bimetal, force in which the bimetal is deformed due to the temperature change and force in which pressure resulting from the hot water act in opposite directions to each other. Thus, the speed, at which the bimetal plate 219 is deformed, is reduced, so the bimetal plate 219 is deformed over time longer than a time at which the bimetal plate 219 is arranged to be deformed in the opposite direction. Therefore, according to another embodiment of the present disclosure, the bimetal plate 219 slowly closes the recirculation fluid passage 13 instead of rapidly closing the recirculation fluid passage 13, thereby preventing a water hammer phenomenon. According to another embodiment of the present disclosure, the water hammer phenomenon may be reduced by using the recirculation valve 2, thereby improving the whole durability of the recirculation valve 2 and the bimetal plate 219.

Use of Cold Water

Figure 15:
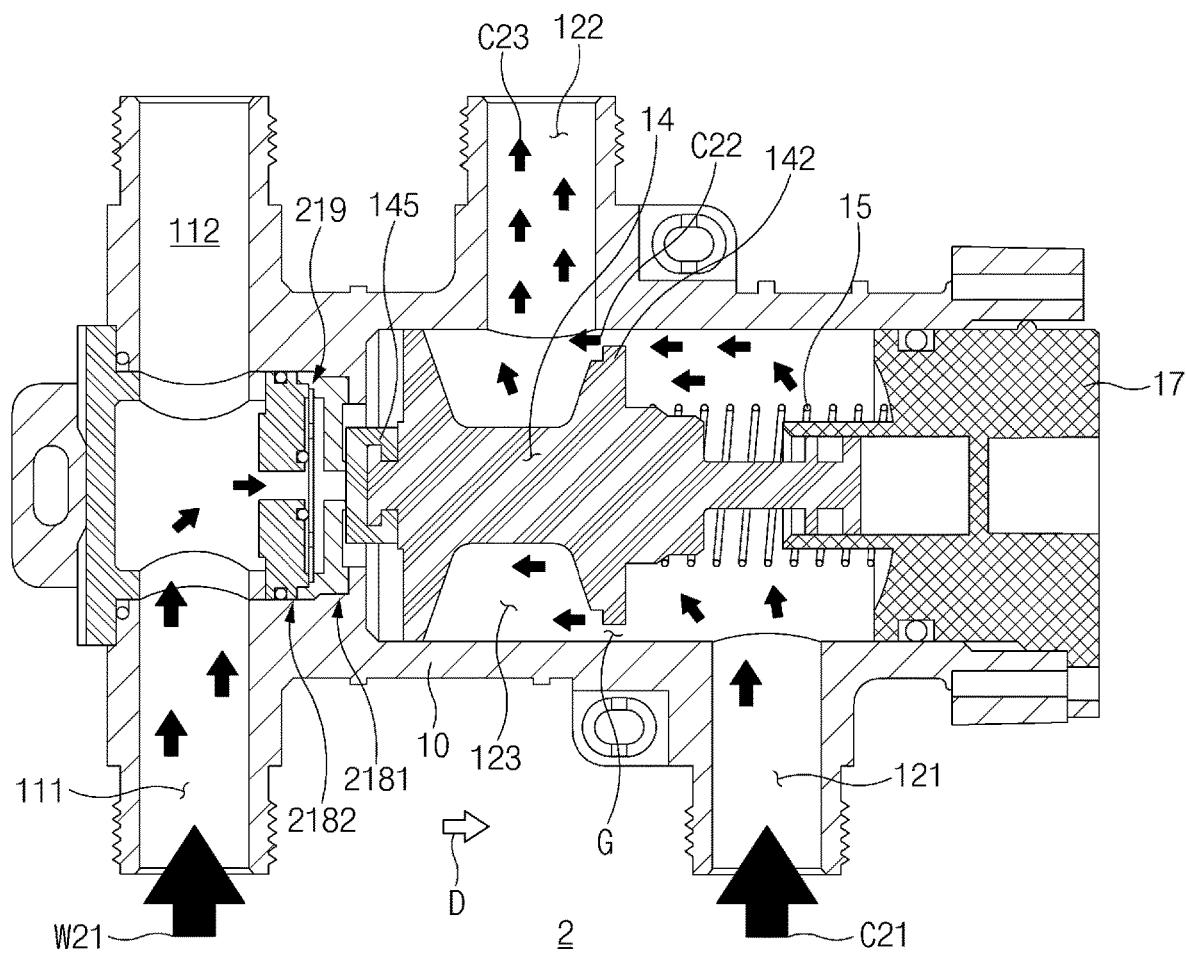
FIG. 15 is a longitudinal sectional view illustrating the state of a recirculation valve, when cold water is used, according to an embodiment of the present disclosure.

FIG. 15 is a longitudinal sectional view illustrating the state of the recirculation valve 2, when cold water is used, according to an embodiment of the present disclosure.

When the user uses cold water by adjusting the faucet of the demand place 51, cold water C21 is supplied to the cold water fluid passage 12 through the cold water supply pipe 42. The cold water C21 is introduced into the housing body 10 through the cold water supply passage 121, and cold water C22 passes through a gap G formed between the inner surface of the housing body 10 and the outer surface of the flange 142 in the cold water intermediate fluid passage 123. Cold water C23 obtained through the cold water intermediate fluid passage 123 flows to the cold water discharge fluid passage 122. Since the cold water flows inside the cold water intermediate fluid passage 123 in the opposite direction to the reference direction D, the flange 142 of the water pressure plate 14 is pressurized in the opposite direction to the reference direction D. The elastic member 15 is extended from the basic length due to the pressure of the cold water pressurizing the water pressure plate 14 when the cold water is used, thereby positioning the water pressure plate 14 at a point closer to the recirculation fluid passage 13 than the basic position. Accordingly, the packing 145 makes contact with the inner opening 21812 to close the inner opening 21812. As the inner opening 21812 is closed, so the recirculation fluid passage 13 is blocked, the hot water W21 may not pass through the recirculation fluid passage 13. Therefore, cold water and hot water is not mixed, and the hot water is not recirculated during the use of cold water. Although drawings illustrate the bimetal plate 219 while focusing on the state of the bimetal plate 219 when the water temperature of the hot water is equal to or greater than the reference temperature, the action of the water pressure plate 14 is similar to that of FIG. 15 even when the water temperature of the hot water is equal to or less than the reference temperature.

When the use of the cold water is stopped, the water pressure applied to the water pressure plate 14 disappears. Accordingly, the elastic member 15 returns to have the basic length due to the elastic restoring force such that the water pressure plate 14 is arranged at the basic position again.

Accordingly, the recirculation of the hot water may be adjusted while a water hammer phenomenon, which occurs when the bimetal plate is deformed, is reduced, thereby reducing the noise and the impact.

In addition, the recirculation of the hot water may be easily performed even in the state that the water hammer phenomenon is reduced, so great impact is not exerted on the bimetal plate and the recirculation valve and noise is reduced.

Although the above description of the embodiment of the present disclosure has been made in that all components are integrated into one part or operate as one part, the present disclosure is not limited thereto. In other words, one or more components may be selectively combined with each other to operate within the scope of the present disclosure. In addition, the terms such as "comprise", "have", or "include" refers to the presence of a relevant component unless specified otherwise, and should be interpreted as further including another component without excluding the another component. Unless otherwise defined herein, all the terms used herein, which include technical or scientific terms, may have the same meaning that is generally understood by a person skilled in the art. It will be further understood that terms used herein should be interpreted as having a meaning that is consistent with their meaning in the context of this disclosure and the relevant art and will not be interpreted in an idealized or overly formal sense unless expressly so defined in the present disclosure Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, embodiments of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure

What is claimed is:

1. A hot water recirculation system comprising:
   a heat source to produce hot water by heating cold water or returning water which serve as introduced source water;
   a hot water supply pipe connected with the heat source to supply the hot water to a demand place;
   a cold water supply pipe connected with a cold water source to supply the cold water to the demand place;
   a recirculation valve connected with the hot water supply pipe and the cold water supply pipe and including a recirculation fluid passage to form the returning water by transferring the hot water, which is received from the hot water supply pipe, to the cold water supply pipe; and
   a recirculation pipe connecting with the cold water source and the heat source, and including a pump connected with the cold water supply pipe to forcibly transfer the cold water from the cold water source to the heat source or to forcibly transfer returning water, which is received in the cold water supply pipe through the recirculation fluid passage, to the heat source,
   wherein the recirculation valve includes:
   a housing including: a hot water fluid passage connected with the hot water supply pipe to allow the hot water to flow; a cold water fluid passage connected with the cold water supply pipe to allow the cold water to flow; and a recirculation fluid passage communicating with the hot water fluid passage and the cold water fluid passage to allow the hot water flowing along the hot water fluid passage to flow into the cold water fluid passage;
   a water pressure plate provided in the cold water fluid passage to close the recirculation fluid passage when the cold water or the hot water is used, and to open the recirculation fluid passage when the cold water are the hot water are not used; and
   a bimetal plate provided in the recirculation fluid passage, and deformed depending on the water temperature of the hot water flowing through the hot water fluid passage to adjust a flow rate of the hot water flowing along the recirculation fluid passage, and
   wherein the bimetal plate completely does not close the recirculation fluid passage.

2. A recirculation valve comprising:
   a housing including: a hot water fluid passage communicating with a hot water supply pipe, which is used to supply hot water produced by heating source water, to allow the hot water to flow through an inner portion of the hot water fluid passage; a cold water fluid passage communicating with a cold water supply pipe, which is used to supply cold water serving as the source water to allow the cold water to flow through an inner portion of the cold water fluid passage; and a recirculation fluid passage communicating with the hot water fluid passage and the cold water fluid passage to allow the hot water in the hot water fluid passage to flow into the cold water fluid passage;
   a water pressure plate provided to close or open the recirculation fluid passage, to close the recirculation fluid passage when the cold water or the hot water is used, and to open the recirculation fluid passage when the cold water and the hot water are not used; and
   a bimetal plate configured to open the recirculation fluid passage as the bimetal plate is spaced apart from a recirculation opening, which is a section of the recirculation fluid passage, when a water temperature of the hot water is less than the reference temperature and to close the recirculation fluid passage by making contact with the recirculation opening when the water temperature of the hot temperature is equal to or greater than the reference temperature, and positioned downstream of the recirculation opening in a direction in which the hot water flows along the recirculation fluid passage.

3. The recirculation valve of claim 2, wherein a bimetal case is disposed inside the recirculation fluid passage, and wherein the bimetal case includes a diaphragm disposed to traverse the recirculation fluid passage and the recirculation opening formed in the diaphragm such that the hot water flows through the recirculation opening, and
   wherein the bimetal plate is positioned adjacent to a side surface, which faces the cold water fluid passage, of the bimetal case.

4. The recirculation valve of claim 3, further comprising:
   an O-ring formed of a material having elasticity and disposed while surrounding the recirculation opening to make contact with the bimetal plate when the bimetal plate closes the recirculation fluid passage.

5. The recirculation valve of claim 2, wherein a plurality of holes are formed through an area, which is adjacent to a rim of the bimetal plate, of the bimetal plate while being spaced apart from each other.

6. The recirculation valve of claim 2, wherein an inner case is disposed inside the recirculation fluid passage, and wherein the inner case includes an inner diaphragm disposed to traverse the recirculation fluid passage and an inner opening allowing the hot water to flow through the inner opening, and
   wherein the water pressure plate is separated from the inner opening to open the inner opening when the hot water is recirculated, and makes contact with the inner opening to close the inner opening when the cold water or the hot water is used.

7. The recirculation valve of claim 6, wherein the water pressure plate includes a packing formed of a material having elasticity, at an area, which makes contact with the inner opening, of the water pressure plate.

8. The recirculation valve of claim 2, further comprising:
   an elastic member connecting the water pressure plate with an inner surface of the housing,
   wherein the elastic member has a basic length, which is neither extended nor compressed to place the water pressure plate at a basic position, when the cold water and the hot water are not used and when the water temperature of the hot water is equal to or greater than the reference temperature,
   wherein the elastic member closes the recirculation fluid passage by placing the water pressure plate at a point closer to the recirculation fluid passage than the basic position as the elastic member extends beyond the basic length due to pressure of the cold water, which pressurizes the water pressure plate, when the cold water or the hot water is used, and places the water pressure plate at the basic position as the elastic member returns to have the basic length due to elastic force when the use of the cold water or the hot water is stopped, and
   wherein the elastic member is compressed to have a length shorter than the basic length due to pressure of the hot water, which pressurizes the water pressure plate to place the water pressure plate at a point farther away from the recirculation fluid passage than the basic position of the water pressure plate when the water temperature of the hot temperature is less than the reference temperature, and returns to have the basic length due to elastic force to place the water pressure plate at the basic position, when the water temperature of the hot temperature is equal to or greater than the reference temperature, when the cold water and the hot water are not used.

9. The recirculation valve of claim 3, wherein an inner case is disposed inside the recirculation fluid passage, and wherein the inner case includes an inner diaphragm disposed to traverse the recirculation fluid passage and an inner opening allowing the hot water to flow through the inner opening, wherein the water pressure plate is separated from the inner opening to open the inner opening when the hot water is recirculated, and makes contact with the inner opening to close the inner opening when the cold water or the hot water is used, wherein the bimetal case and the inner case are placed at opposite points while interposing the bimetal plate between the bimetal case and the inner case, and wherein the bimetal case is disposed to be closer to the hot water fluid passage than the inner case.

10. The recirculation valve of claim 2, wherein the cold water fluid passage includes:

a cold water supply fluid passage to supply the cold water to an inner part of the housing and to discharge hot water, which is introduced along the recirculation fluid passage, to an outside of the housing for recirculation;

a cold water discharge fluid passage to discharge the cold water to the outside of the housing; and a cold water intermediate fluid passage communicating with the cold water supply fluid passage, the cold water discharge fluid passage, and the recirculation fluid passage and receiving the water pressure plate in the cold water intermediate fluid passage, wherein the water pressure plate includes:

a shaft extending in an extending direction of the cold water intermediate fluid passage, and supported by an inner surface of the housing, which defines the cold water intermediate fluid passage; and a flange radially expanded from the shaft to linearly move in the extending direction of the cold water intermediate fluid passage as the flange is pressurized by the cold water or the hot water, and wherein the cold water supply fluid passage and the cold water discharge fluid passage are spaced apart from each other in the extending direction of the cold water intermediate fluid passage and communicate with each other through the cold water intermediate fluid passage.

11. The recirculation valve of claim 10, wherein an outer surface of the flange is spaced apart from the inner surface of the housing to form a gap such that the hot water or the cold water is able to flow.

12. The recirculation valve of claim 2, wherein the bimetal plate opens the recirculation fluid passage as the bimetal plate is curved in a convex shape in a direction in which the hot water flows along the recirculation fluid passage, when the water temperature of the hot temperature is less than the reference temperature, and wherein the bimetal plate closes the recirculation fluid passage as the bimetal plate is curved in a convex shape in a direction opposite to the direction in which the hot water flows along the recirculation fluid passage, when the water temperature of the hot temperature is equal to or greater than the reference temperature.

* * * * *